US011790661B2

(12) United States Patent
Matsumura et al.

(10) Patent No.: US 11,790,661 B2
(45) Date of Patent: Oct. 17, 2023

(54) IMAGE PREDICTION SYSTEM

(71) Applicant: Hitachi, Ltd., Tokyo (JP)

(72) Inventors: Tadayuki Matsumura, Tokyo (JP); Kanako Esaki, Tokyo (JP); Hiroyuki Mizuno, Tokyo (JP); Kiyoto Ito, Tokyo (JP)

(73) Assignee: HITACHI, LTD., Tokyo (JP)

(*) Notice: Subject to any disclaimer, the term of this patent is extended or adjusted under 35 U.S.C. 154(b) by 495 days.

(21) Appl. No.: 17/126,441

(22) Filed: Dec. 18, 2020

(65) Prior Publication Data
US 2021/0264188 A1 Aug. 26, 2021

(30) Foreign Application Priority Data

Feb. 26, 2020 (JP) ................... 2020-030329

(51) Int. Cl.
G06V 20/56 (2022.01)
G06V 10/20 (2022.01)
G06N 5/04 (2023.01)
G06N 20/00 (2019.01)
G06V 10/44 (2022.01)
(Continued)

(52) U.S. Cl.
CPC .............. *G06V 20/56* (2022.01); *G06F 18/21* (2023.01); *G06F 18/22* (2023.01); *G06F 18/25* (2023.01); *G06N 3/045* (2023.01); *G06N 3/047* (2023.01); *G06N 5/04* (2013.01); *G06N 20/00* (2019.01); *G06V 10/255* (2022.01);
(Continued)

(58) Field of Classification Search
CPC .... G06V 20/56; G06V 10/255; G06V 10/454; G06V 10/82; G06F 18/21; G06F 18/22; G06F 18/25; G06N 5/04; G06N 20/00; G06N 3/045; G06N 3/044; G06N 3/047; G06N 3/088
See application file for complete search history.

(56) References Cited

U.S. PATENT DOCUMENTS 8,315,449 B2 * 11/2012 Kemper ................. G06T 7/143
382/128
9,465,129 B1 * 10/2016 Olsson ..................... G01V 3/15
(Continued)

OTHER PUBLICATIONS

Xingjian Shi, et al. "Convolutional LSTM Network: A Machine Learning Approach for Precipitation Nowcasting", In Proceedings of NIPS 2015.

Primary Examiner — Asghar H Bilgrami
(74) Attorney, Agent, or Firm — MATTINGLY & MALUR, PC

(57) ABSTRACT

To generate a prediction image in which an outline of an object is clear and existence of the object is easily recognized, the image prediction system that generates a future prediction image and includes a gaze unit, a working memory unit, a control unit, and a generation model unit. The gaze unit controls a region including an object included in an observation image as a first gaze region. The working memory unit controls the first gaze region as a second gaze region when a difference in the first gaze region between the observation image and a prediction image is equal to or less than a predetermined value. The generation model unit generates prediction images of the first gaze region and the second gaze region. The control unit integrates the prediction image of the first gaze region and the prediction image of the second gaze region to generate a prediction image.

14 Claims, 31 Drawing Sheets

(51) Int. Cl.
*G06V 10/82* (2022.01)
*G06F 18/21* (2023.01)
*G06F 18/22* (2023.01)
*G06F 18/25* (2023.01)
*G06N 3/045* (2023.01)
*G06N 3/047* (2023.01)
*G06N 3/088* (2023.01)

(52) U.S. Cl.
CPC ............ *G06V 10/454* (2022.01); *G06V 10/82* (2022.01); *G06N 3/088* (2013.01)

(56) References Cited

U.S. PATENT DOCUMENTS

| | | | |
|---|---|---|---|
| 2012/0224088 A1* | 9/2012 | Jelinek | H04N 23/6815 348/E5.048 |
| 2019/0354177 A1* | 11/2019 | Horiuchi | G06F 3/167 |
| 2021/0297635 A1* | 9/2021 | Horiuchi | G02B 21/365 |

* cited by examiner

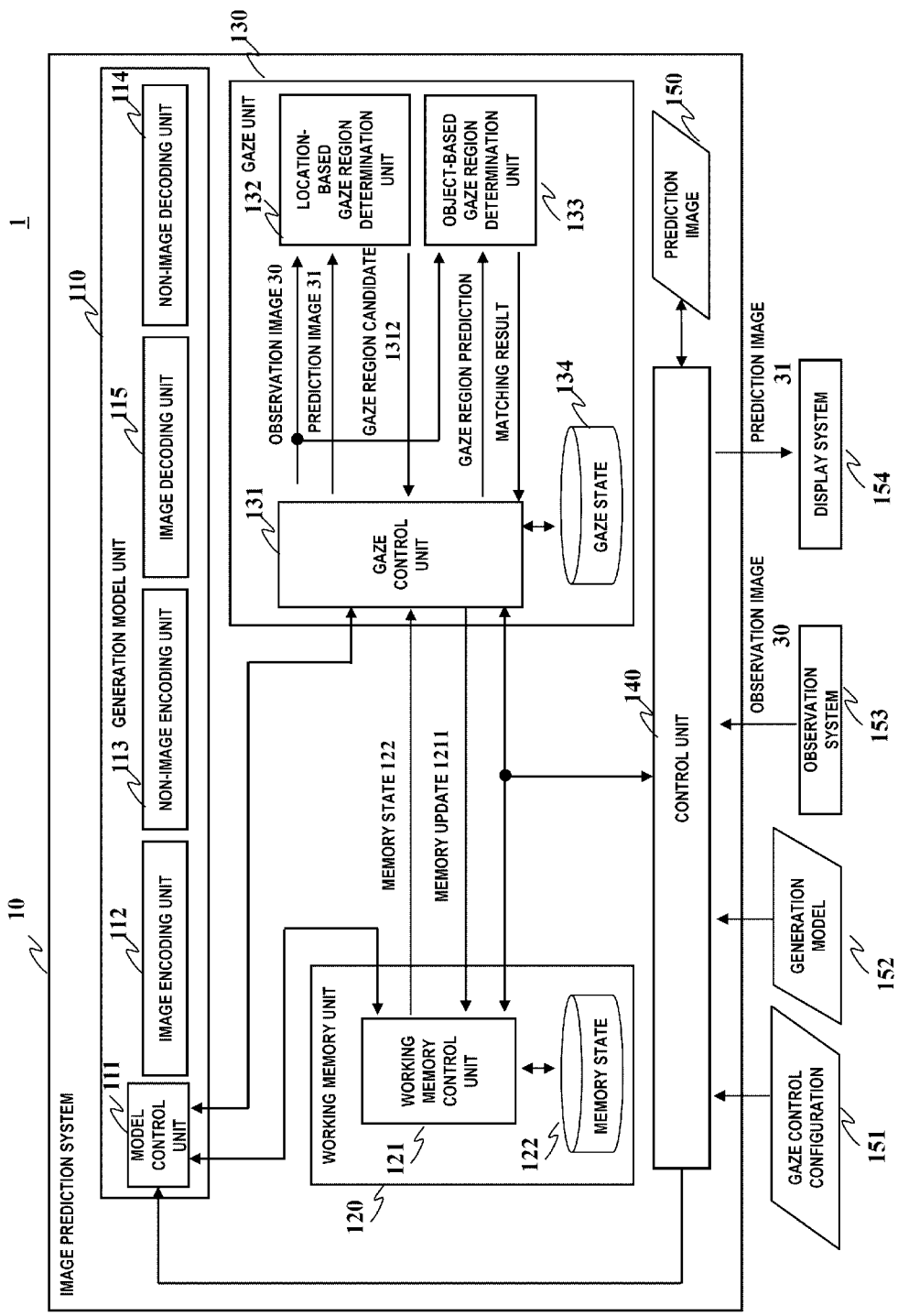

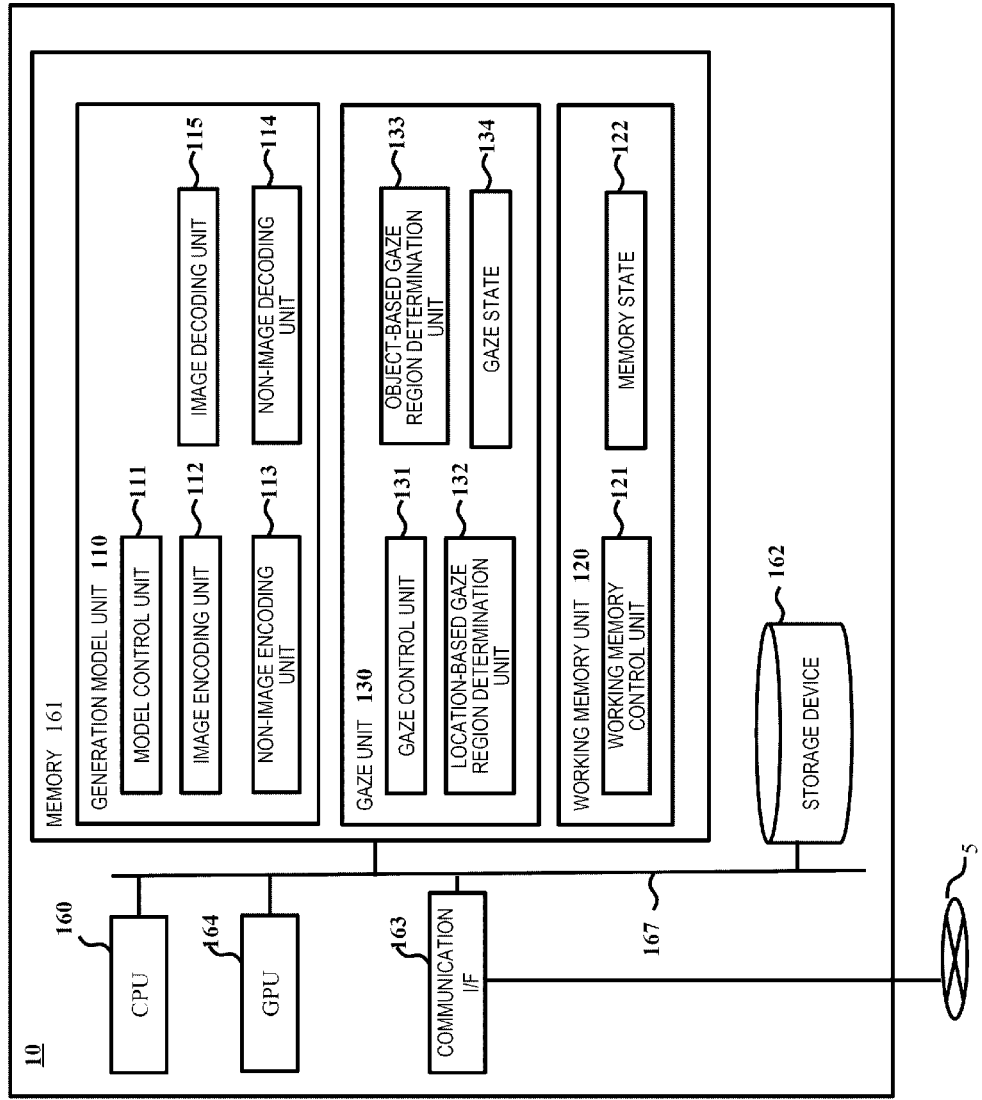

FIG. 2

| LAYER | LAYER PARAMETER | WEIGHT PARAMETER |
|---|---|---|
| Convolution2D | (3, 32, (3,3), ReLu) | (0.2, 0.1, ...) |
| MaxPooling2D | (2, 2) | - |
| Convolution2D | (32, 64, (3,3), ReLu) | (0.3, 0.7, ...) |
| Linear | (256, 10, Softmax) | (0.4, 0.9, ...) |

MEMORY STATE 122

| ID | x | y | w | h | ACTIVITY | IMAGE | GENERATION MODEL INTERNAL STATE |
|---|---|---|---|---|---|---|---|
| 1 | 15 | 20 | 20 | 20 | True | (0.1, 0.3, ..., 0.5) | $(h,c)_{enc}=(0.1,...),$ $(h,c)_{dec}=(0.3,...)$ |
| 2 | 30 | 70 | 20 | 30 | True | (0.2, 0.1, ..., 0.9) | $(h,c)_{enc}=(0.2,...),$ $(h,c)_{dec}=(0.2,...)$ |
| 3 | - | - | - | - | False | - | - |

80, 81, 82, 83, 84, 85

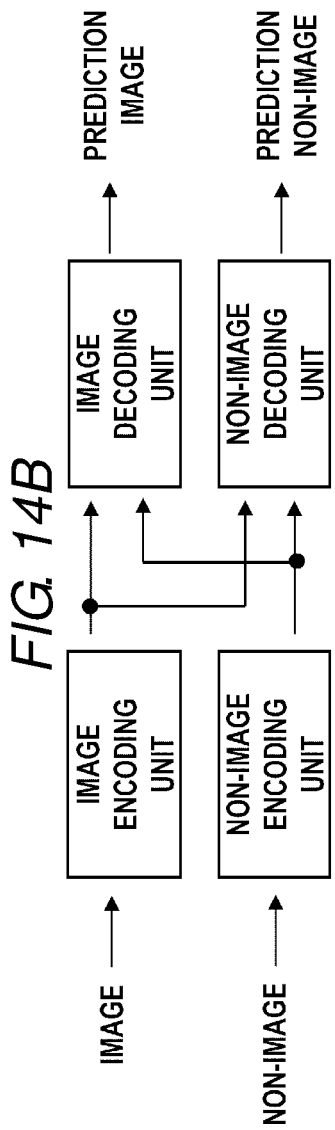

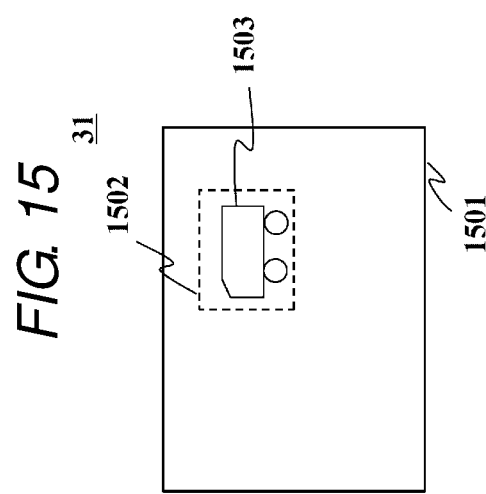

FIG. 29

TIME POINT MEMORY GAZE STATE 134a

| t (2901) | x (71) | y | w (72) | h | ACTIVITY (73) | IMAGE (75) | GENERATION MODEL INTERNAL STATE (76) |
|---|---|---|---|---|---|---|---|
| 0 | 15 | 20 | 20 | 20 | True | (0.1, 0.3, ..., 0.5) | $(h,c)_{enc}=(0.1,...), (h,c)_{dec}=(0.3,...)$ |
| 1 | 20 | 15 | 20 | 20 | True | (0.2, 0.3, ..., 0.3) | $(h,c)_{enc}=(0.1,...), (h,c)_{dec}=(0.3,...)$ |
| 2 | 25 | 10 | 20 | 20 | True | (0.2, 0.2, ..., 0.3) | $(h,c)_{enc}=(0.1,...), (h,c)_{dec}=(0.3,...)$ |

TIME POINT MEMORY STATE 122a

| ID (80) | t (2902) | x (81) | y | w (82) | h | ACTIVITY (83) | IMAGE (84) | GENERATION MODEL INTERNAL STATE (85) |
|---|---|---|---|---|---|---|---|---|
| 1 | 1 | 15 | 20 | 20 | 20 | True | (0.1, 0.3, ..., 0.5) | $(h,c)_{enc}=(0.1,...), (h,c)_{dec}=(0.3,...)$ |
| 1 | 2 | 30 | 70 | 20 | 30 | True | (0.2, 0.1, ..., 0.9) | $(h,c)_{enc}=(0.2,...), (h,c)_{dec}=(0.2,...)$ |
| 1 | 3 | 40 | 80 | 20 | 30 | True | (0.2, 0.1, ..., 0.8) | $(h,c)_{enc}=(0.7,...), (h,c)_{dec}=(0.8,...)$ |
| 2 | 1 | 30 | 70 | 20 | 30 | True | (0.1, 0.1, ..., 0.1) | $(h,c)_{enc}=(0.3,...), (h,c)_{dec}=(0.4,...)$ |
| 2 | 2 | 25 | 75 | 20 | 30 | True | (0.3, 0.1, ..., 0.1) | $(h,c)_{enc}=(0.2,...), (h,c)_{dec}=(0.7,...)$ |
| 2 | 3 | 20 | 80 | 20 | 30 | True | (0.1, 0.1, ..., 0.2) | $(h,c)_{enc}=(0.9,...), (h,c)_{dec}=(0.4,...)$ |
| ... | | | | | | | | ... |

IMAGE PREDICTION SYSTEM

CROSS-REFERENCE TO RELATED APPLICATION

The present application claims priority from Japanese application JP 2020-030329, filed on Feb. 26, 2020, the contents of which is hereby incorporated by reference into this application.

BACKGROUND OF THE INVENTION

1. Field of the Invention

The present invention relates to a prediction image generation technology that predicts a future image.

2. Description of the Related Art

With the progress of deep learning technology in image applications, research and development related to a moving picture prediction technology that predicts image sequences (moving pictures) in the near future based on current observation images is becoming active.

The future image prediction technology is expected to be used as an elemental technology in sophistication and safety of autonomous driving systems and model-based deep reinforcement learning.

X. Shi et al., "Convolutional LSTM network: A machine learning approach for precipitation nowxasting", In Proceedings of NIPS 2015. (Non-Patent Literature 1) discloses a technology that generates a future prediction image by combining a convolutional neural network that processes images in pre-divided grid units and a long-short term memory (LSTM) which is a type of neural network having an internal state and predicting a time-series change for each pixel set divided by a predetermined grid.

In the technology disclosed in Non-Patent Literature 1, a time-series change of an input image is predicted for each pixel set divided by a predetermined grid. Therefore, changes in units of objects such as a vehicle and a person that exist in the input image cannot be predicted, and a prediction time increases, so that a generated prediction image becomes an image in which it is difficult to identify what kind of object exists. When it is considered to apply such a technology to autonomous driving, it is considered that it is difficult to identify an object such as whether or not there is a person or whether or not there is an oncoming vehicle in the prediction image, which is a safety issue.

SUMMARY OF THE INVENTION

An object of the invention is to provide a technology that generates a prediction image on which existence of an object can be recognized.

An image prediction system that generates a future prediction image based on an observation image according to an aspect of the invention includes a gaze unit, a working memory unit, a control unit, and a generation model unit.

The gaze unit includes a location-based gaze region determination unit that generates a difference for each pixel between an observation image and a prediction image for a region including an object in the observation image, generates a rectangular region including the object and determines the rectangular region as a first gaze region candidate, a gaze control unit that receives information related to the first gaze region candidate and selects one of the first gaze region candidate as a first gaze region under a predetermined condition, and a first storage unit that stores information on the first gaze region as a gaze state.

The generation model unit generates a prediction image of the first gaze region. When a difference in the first gaze region between the observation image and the prediction image is equal to or less than a predetermined value, the working memory unit sets the first gaze region as a second gaze region, and includes a second storage unit that stores the information on the second gaze region as a memory state.

The generation model unit generates the prediction image of the first gaze region, outputs the prediction image to the gaze control unit, generates a prediction image of the second gaze region and outputs the prediction image to the working memory unit.

The control unit integrates the prediction image of the first gaze region from the gaze unit and the prediction image of the second gaze region from the working memory unit to generate a prediction image for the observation image.

According to the aspect of the invention, it is possible to recognize the existence of a plurality of objects in an image.

BRIEF DESCRIPTION OF THE DRAWINGS

FIG. 1A is a diagram showing a functional configuration example of an image prediction system.

FIG. 1B is a hardware block diagram of the image prediction system.

FIG. 2 is a diagram showing a configuration example of generation model information.

FIG. 8 is a diagram showing information on a memory state.

FIG. 14B is a diagram showing a configuration example of the non-image encoding unit and the non-image decoding unit which input an encoding result mutually.

FIG. 15 is a diagram illustrating generation of a prediction image for the gaze region.

FIG. 29 is a diagram showing information on another gaze state and memory state.

DESCRIPTION OF THE PREFERRED EMBODIMENTS

Figure 3:
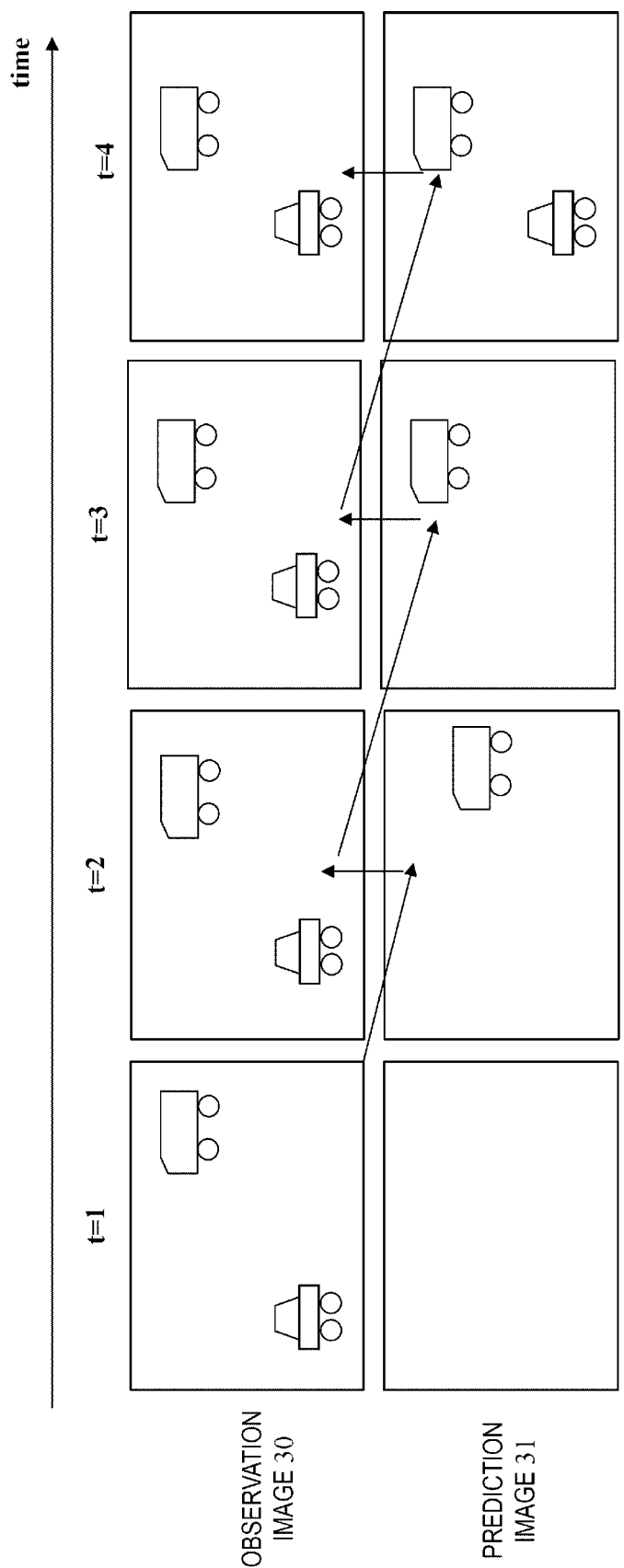
FIG. 3 is a diagram showing an example of observation images input from an observation system and generation of prediction images.

Hereinafter, embodiments of the invention will be described with reference to the drawings. However, these embodiments are only for implementing the invention, and do not limit the technical scope of the invention. In the drawings, common components are denoted by the same reference numerals.

An image prediction system according to an embodiment disclosed below receives an image sequence as input, and outputs a future image sequence (prediction image) of a certain period of time.

First Embodiment

FIG. 1A shows an overall functional configuration of a system 1 including an image prediction system 10 according to a first embodiment. The system 1 includes the image prediction system 10, and an observation system 153 and a display system 154 that are connected to the image prediction system 10.

The image prediction system 10 includes a generation model unit 110, a working memory unit 120, a gaze unit 130, and a control unit 140. A gaze control configuration 151 and a generation model 152 are input into the image prediction system 10 from outside.

The working memory unit 120 controls a gaze region (referred to as a second gaze region) set for a past image. The generation model unit 110 generates a prediction image in the second gaze region managed by the working memory unit 120. The gaze region is a partial region to be processed including an object of interest such as a person or a vehicle included in an image.

The gaze unit 130 controls a gaze region (referred to as a first gaze region) in an observation image based on the observation image acquired from the observation system 153. The generation model unit 110 generates a future prediction image of the first gaze region. The gaze unit 130 controls the first gaze region for a region that is not set as the second gaze region by the working memory unit 120. For example, the gaze unit 130 detects an object of interest such as a person or a vehicle that newly appears in the image, and controls a region including the detected object. In the embodiment, when the first gaze region and the second gaze region can be understood without distinction, simply gaze region may be described.

The generation model unit 110 encodes an image of the gaze region controlled by the gaze unit 130 and the working memory unit 120, and decodes an encoding result to generate a future image of the gaze region.

The control unit 140 controls the gaze unit 130 and the working memory unit 120, integrates the prediction images of the gaze region generated by the gaze unit 130 and the working memory unit 120, and generates one prediction image.

The observation system 153 acquires an observation image from an observation target. For example, the observation system 153 is a surveillance camera system in a building, an outdoor fixed point observation camera system, or an in-vehicle camera system.

The display system 154 is a server or PC including a display device, a display device connected to the server and the PC via a network, or a mobile device such as a smartphone that can be connected via the network.

The generation model 152 input to the image prediction system 10 includes model information and model parameter information. For example, as shown in FIG. 2, when the generation model is constructed by a neural network, a layer 21 and a layer parameter 22 correspond to the model information. As the layer 21, a two-dimensional convolution layer (Convolution 2D), a two-dimensional maximum value pooling layer (MaxPooling 2D), a two-dimensional convolution layer, and a linear layer (Linear), which are types of each layer of the neural network, can be given as examples in order from the input. A weight parameter 23 corresponds to the model parameter information.

The gaze control configuration 151 input to the image prediction system 10 is information used by the gaze unit 130 to control the first gaze region.

FIG. 1B is a hardware block diagram of the image prediction system 10. Similar to a general computer, the image prediction system 10 includes a CPU 160 which is a processing unit, a memory 161 such as DRAM, a storage device 162 implemented by a nonvolatile memory such as HDD and SSD, and a communication interface 163 which is connected to a network 5 and communicates with an external device. The image prediction system 10 may include a GPU 164 as a processing unit for a purpose of speeding up the processing. The CPU 160, the memory 161, the storage device 162, the communication interface 163, and the GPU 164 are connected to one another by a connection portion 167 such as a bus.

The memory 161 stores various programs, and implements various functions of the generation model unit 110, the gaze unit 130, the working memory unit 120, and the control unit 140 by the CPU 160, which is the processing unit, executing the various programs.

Programs constituting the generation model unit 110 include programs constituting a model control unit 111, an image encoding unit 112, a non-image encoding unit 113, a non-image decoding unit 114, and an image decoding unit 115.

Programs constituting the gaze unit 130 include programs constituting a gaze control unit 131, a location-based gaze region determination unit 132, and an object-based gaze region determination unit 133.

Programs constituting the working memory unit 120 include a program constituting the working memory control unit 121.

In the present embodiment, functions of such as the model control unit 111, the image encoding unit 112, the non-image encoding unit 113, the non-image decoding unit 114, and the image decoding unit 115 in the generation model unit 110, the gaze control unit 131, the location-based gaze region determination unit 132, and the object-based gaze region determination unit 133 in the gaze unit 130, and the working memory control unit 121 of the working memory unit 120 are implemented by the CPU 160 or the GPU 164 which is the processing unit. Therefore, an operation subject is the CPU 160 or the GPU 164, but description may be made with each function as the operation subject in order to facilitate understanding of the description.

The storage device 162 stores learning data of the generation model that is held by the generation model unit 110 and can be acquired during system operation.

A memory state 122 is stored in a storage region (second storage unit) of the memory 161 and is information related to the second gaze region that is set for the past image in order to generate the prediction image by the generation model unit 110. A gaze state 134 is stored in the storage region (first storage unit) of the memory 161 and is information that is related to the first gaze region of the observation image and that is set for the image information acquired from the observation system 153 in order to generate the prediction image by the generation model unit 110. The information on the memory state 122 and the gaze state 134 may be stored in the storage device 162 and readout and processed in the memory 161. By storing the memory state 122 and the gaze state 134 in the storage device 162, the prediction image can be generated for the same gaze region after system restart.

For example, the gaze unit 130 extracts a gaze region including an object such as a person or a vehicle newly reflected in the observation image as the first gaze region. The generation model unit 110 generates the prediction image of the first gaze region based on information related to the first gaze region from the gaze unit 130.

When the observation image of the first gaze region is the same as the prediction image generated by the generation model unit 110 (including the case where a difference between the observation image and the prediction image is within a certain range), control of the gaze region is shifted to the working memory unit 120. That is, the working memory unit 120 supplements the region where the change is small among the regions set as the gaze regions by the gaze unit 130. The generation model unit 110 generates a prediction image of the second gaze region controlled by the working memory 120.

FIG. 3 is a diagram showing an example of observation images 30 received from the observation system 153 and prediction images 31 generated by the image prediction system 10. The prediction image 31 is obtained by combining the prediction image of the first gaze region controlled by the gaze unit 130 and the prediction image of the second gaze region controlled by the working memory unit 120 into an image (canvas) having the same size as the observation image 30 by the control unit 140. The generation of each prediction image will be described later.

As shown in FIG. 3, images on which two vehicles are moving left and right respectively are observed. The image prediction system 10 repeatedly acquires the observation image 30 for each time point and generates the prediction image 31 for the observation one time period ahead of the each time point. The prediction image at t=2 is predicted based on the observation image 30 at t=1, and the prediction image at t=3 is predicted based on the observation image 30 at t=2. In FIG. 3, in a case of generating the prediction image 31 of the observation one time period ago, although only the image at current time is used as the observation image 30, a plurality of images observed in the past including the current time can be used.

Figure 4:
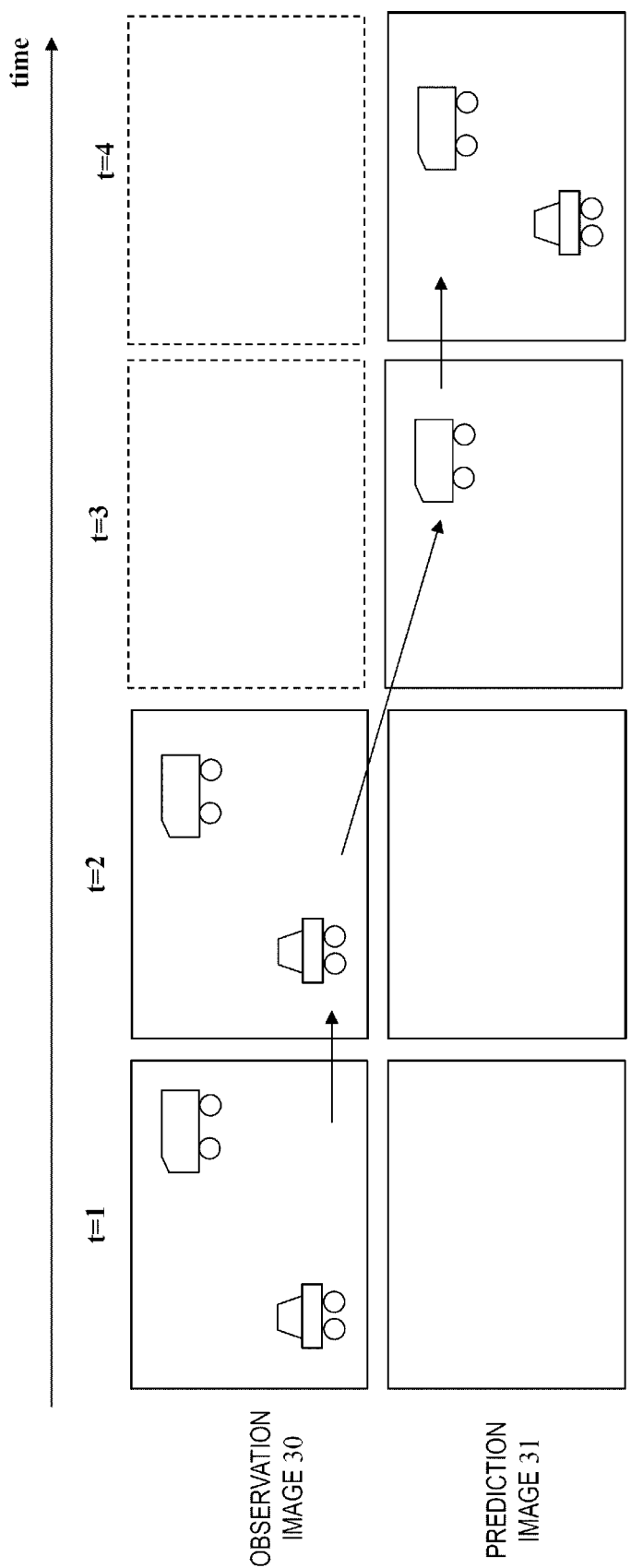
FIG. 4 is a diagram showing another example of the observation images input from the observation system and generation of the prediction images.

FIG. 4 is a diagram showing another example of the observation images 30 received from the observation system 153 and the prediction images 31. After observation at certain time points, prediction a plurality of time periods ahead of each of the certain time points can be continuously generated. That is, a plurality of prediction images at t=3 and t=4 are predicted after observation at observation time points t=1 and t=2.

For example, the observation image and the prediction image at t=2 shown in FIGS. 3 and 4 are input to the gaze unit 130. In an initial state such as t=1, an observation image one time period ago is used as the prediction image or the prediction image 31 is an all-black or white blank image having the same size as the observation image 30.

The location-based gaze region determination unit 132 of the gaze unit 130 obtains a candidate for a region to be gazed on a location-based basis based on the received observation image 30 and the prediction image 31.

Figure 5:
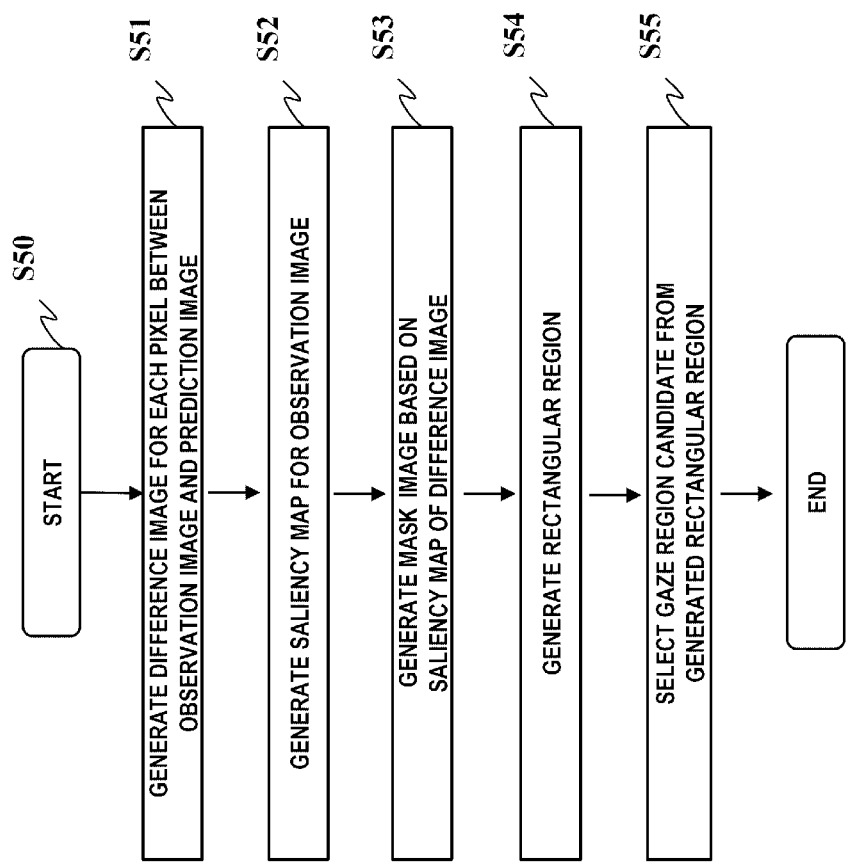
FIG. 5 is a flowchart showing a processing procedure of a location-based gaze region determination unit.

FIG. 5 is a flowchart showing an example of a processing procedure of the location-based gaze region determination unit 132 of the gaze unit 130. The location-based gaze region determination unit 132 extracts a gaze region candidate 1312 (see FIG. 6) from the observation image 30 and the prediction image 31. The gaze region candidate 1312 is, for example, a region having a large difference (per pixel) between the observation image 30 and the prediction image 31. More specifically, the gaze region candidate 1312 is a region for predicting a future image related to an object such as a person or a vehicle that newly appears in the observation image. Since the object such as the person or the vehicle that newly appears in the observation image is not included in the prediction image 31 but is included in the observation image 30, the difference between the observation image and the prediction image for each pixel increases. The same applies to the object such as a person or a vehicle that has a motion contrary to the prediction.

First, the location-based gaze region determination unit 132 generates a difference image for each pixel between the observation image 30 and the prediction image 31 at the same time point (for example, t=2) (S51).

Next, a saliency map for the observation image is generated (S52). The saliency map is image information that represents weighting on the observation image at a region to which a line of sight of a person is considered to be directed, such as a region in which an object exists or a region in which a color is different from the surroundings, and at regions other than such a region. The saliency map can be generated algorithmically based on pre-designed feature quantities implemented in a computer vision library. It is also possible to generate the feature quantity using a machine learning method that acquires the feature quantity from data by learning.

Next, based on the saliency map generated in step S52, mask processing is applied to the difference image generated in step S51, and a region (mask image) to which a line of sight of a person is considered to be directed in the difference image is extracted (S53).

Next, a rectangular region is generated for the mask image to which the mask processing is applied based on the saliency map (S54). The rectangular region can be extracted by a computer vision algorithm.

Finally, with one fixed point of the image as an origin, a generated rectangular region group is summarized such that a position and size of each rectangular region are expressed in pixel unit. A gaze region candidate is selected from the rectangular region group by excluding a rectangular region having an area equal to or less than a predetermined threshold value (S55). Threshold value information of the area to be excluded is input from the outside as gaze control configuration information.

Figure 6:
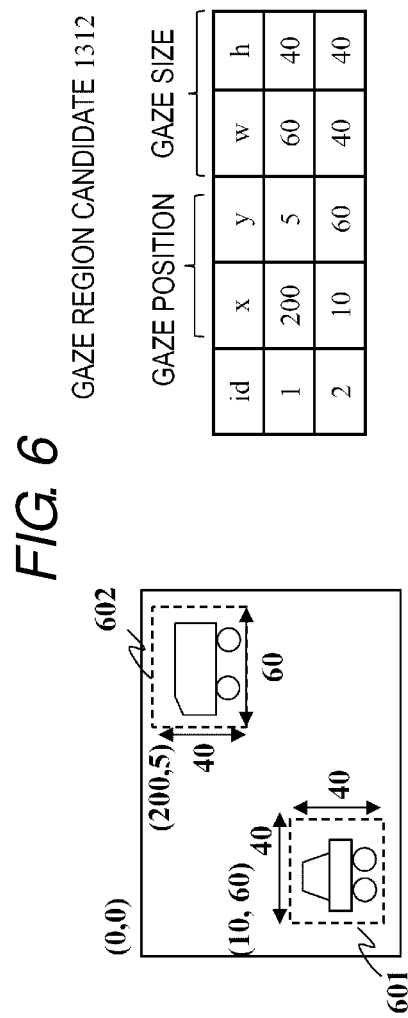
FIG. 6 is a diagram showing an example of a generation result of a gaze region by the location-based gaze region determination unit and gaze region candidate information.

For example, as shown in FIG. 6, when an origin (0, 0) is set at an upper left corner of the image and two regions of rectangular regions 601 and 602 are generated, first gaze region candidates are selected in which upper left coordinate information (x, y) of respective rectangular regions is (10, 60) and (200, 5), and respective sizes (w, h) are (40, 40) and (60, 40). As information related to the first gaze region candidates, the coordinates and the sizes are output to the gaze control unit 131 as the gaze region candidate 1312.

In general, in the application of the computer vision algorithm, in order to make a processing result robust, compression and expansion processing is applied to an input image and an output image. In each processing disclosed in the first embodiment, pre-processing and post-processing such as the compression and expansion processing may be applied in a timely manner for the purpose of a robust processing result.

The gaze control unit 131 updates the first gaze state 134 for the observation image 30 based on the gaze region candidate 1312 from the location-based gaze region determination unit 132, the gaze state 134, and working memory state information (hereinafter, the memory state 122) transmitted from the working memory unit 120. The reason for inputting the memory state to the gaze control unit 131 is that the region managed as the second gaze region by the working memory unit 120 is not processed as a new gaze region by the gaze unit 130. A determination standard for the gaze state 134 is used such that, for example, when a difference is large as compared with the past gaze region of the gaze unit 130, the gaze unit 130 continues the processing, and when the difference is small, the processing is shifted to the working memory unit 120.

In the present embodiment, a configuration in which one first gaze region is set is described, but the present embodiment can also be applied to a case where two or more first gaze regions are set. The number of first gaze regions is determined based on a computational resource of a system including allowable computational time.

Figure 7:
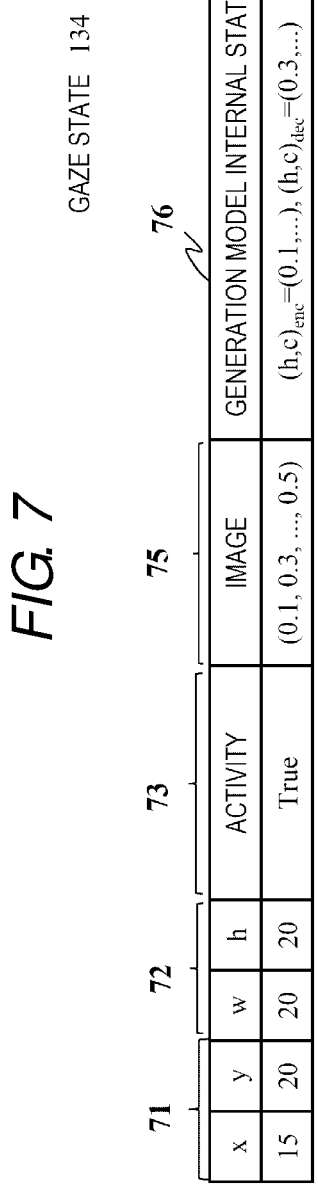
FIG. 7 is a diagram showing information on a gaze state.

FIG. 7 is a diagram showing an example of the gaze state 134, which is information related to the first gaze region in the observation image.

The gaze state 134 includes activity information 73 which is information indicating whether or not the region is gazed, information on coordinates 71 and a size 72 of the first gaze region in the image, and image information (image 75) which is image information of the image. A case where the activity information 73 is True indicates that the region is being gazed. The gaze state 134 is information for managing the coordinates 71, the size 72, the activity information 73, the image 75, and a generation model internal state 76 of the first gaze region in association with one another.

In the initial state, the activity information 73 in the gaze state 134 is inactive (False value), and values of the coordinates 71, the size 72, and the image 75 are meaningless values. The generation model internal state 76 indicates a variable of a learning model for predicting a first gaze region at a next time point based on the observation image.

FIG. 8 is a diagram showing an example of information on the memory state. FIG. 8 shows an example of a case where three working memories are provided. The memory state 122 manages a unique identifier 80, coordinates 81 and a size 82 of the second gaze region to be processed in the image, activity information 83, and image information (image 84) indicating the image. When the generation model is constituted by a model having an internal state such as a recurrent neural network (RNN) or a long-term memory (LSTM), the memory state 122 includes information indicating a generation model internal state 85. The generation model internal state 85 indicates a variable of a learning model for predicting a second gaze region at a next time point based on the past image in the working memory unit 120.

In the initial state, meaningless values are held in the coordinates 81, the size information 82, the image 84, and the generation model internal state 85.

Figure 9:
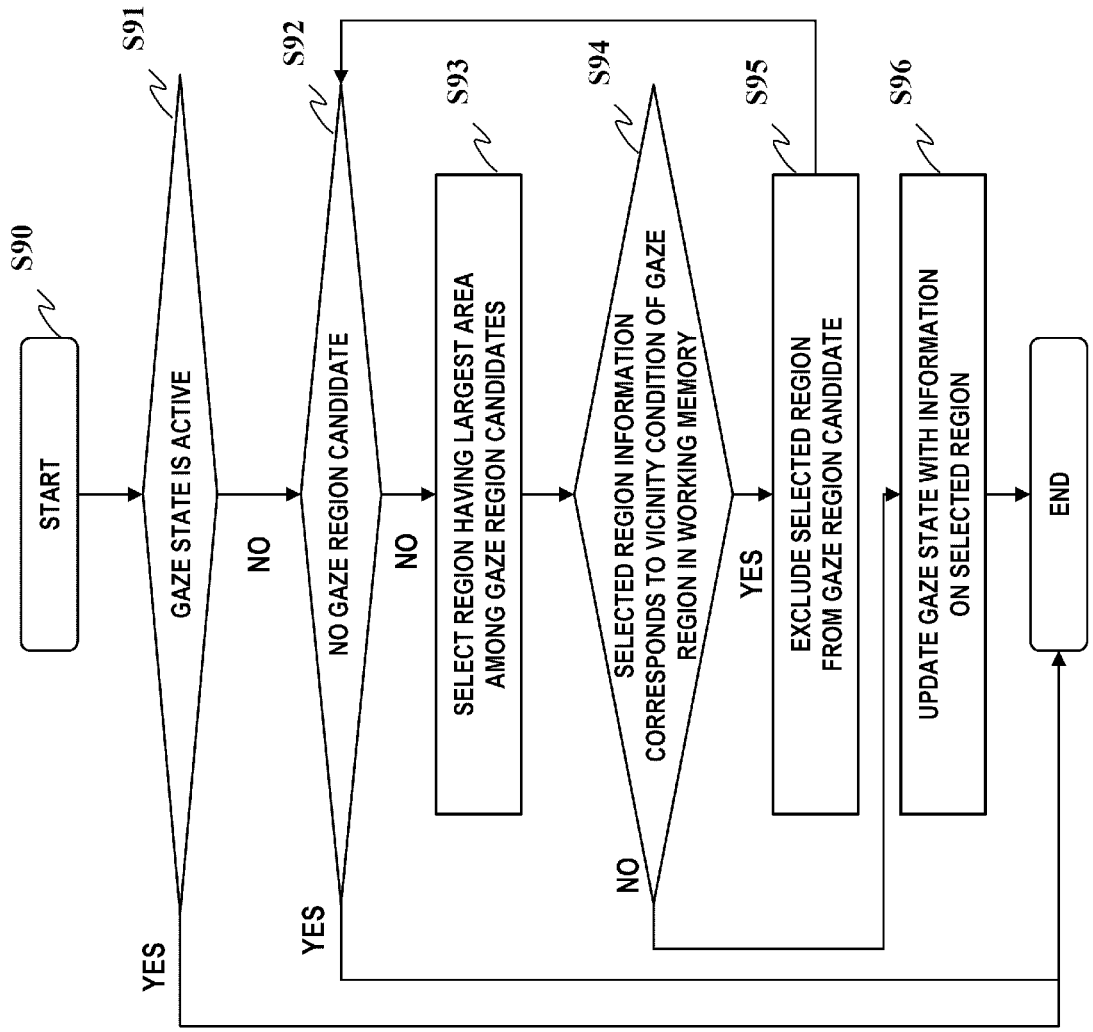
FIG. 9 is a flowchart showing a processing procedure of updating the gaze state.

FIG. 9 is a flowchart showing an example of a procedure in which the gaze control unit 131 updates the information on the gaze state 134. First, when the gaze region candidate 1312 is received from the location-based gaze region determination unit 132, the gaze control unit 131 determines, based on the coordinate information of the gaze region candidate 1312, whether the gaze state is active with reference to the activity information 73 of the gaze state 134 (S91).

When the gaze state 134 is active, since the first gaze region is already set in the gaze unit 130, the update processing is ended without updating a first gaze state regardless of the information of the gaze region candidate 1312 generated by the location-based gaze region determination unit 132.

When the gaze state 134 is not active, it is determined whether an entry exists in the gaze region candidate 1312 (S92).

When the gaze region candidate exists, one of the gaze regions of the gaze region candidate 1312 is selected under a predetermined condition (S93). For example, a region having a largest area is selected. The area is calculated based on the size information (h, w) of each rectangular region. The area may be calculated in advance and included in the information of the gaze region candidate. In this step, a rectangular region having the largest area is selected, but it is possible to specify an object desired to be gazed and select a region including the object.

When there is no gaze region candidate (YES in step 92), the update processing ends without updating the first gaze state.

Next, it is determined whether or not the gaze region selected in step S93 is in the vicinity of the second gaze region held in the working memory unit 120 (S94). When there are a plurality of second gaze regions held in the working memory unit 120, the determination is made for each of the second gaze regions. The vicinity condition in step S94 is confirmed because the region already managed as the second gaze region by the working memory unit 120 is not processed as a new first gaze region by the gaze unit 130.

When it is determined that the selected gaze region candidate is not in the vicinity of the second gaze region held in the working memory, the coordinates and the size of the gaze region candidate selected in step S93 are written in the coordinates and the size of the first gaze state 134, active/inactive information is written in the activity information (True value), and an initial value defined by the generation model is written in the generation model internal state (S96). Accordingly, the new region is updated to be the first gaze region.

When it is determined that the selected region is in the vicinity of the second gaze region held in the working memory, the selected rectangular region is excluded from the gaze region candidates (S95), and the processing returns to step S92.

The determination of the vicinity condition between the selected gaze region candidate and the second gaze region in the working memory is made based on whether or not a difference in coordinate and size between the gaze regions is within a preset threshold value. The threshold value used for the vicinity determination of the difference in coordinate and size is given by the gaze control configuration received from the outside.

The vicinity determination may be executed in a case of including an image in the rectangular region. The image may be converted into a specific vector using the image encoding unit 112 via the control unit of the generation model unit (model control unit 111), and a difference in converted vector may be set as a value of the vicinity determination.

Figure 10:
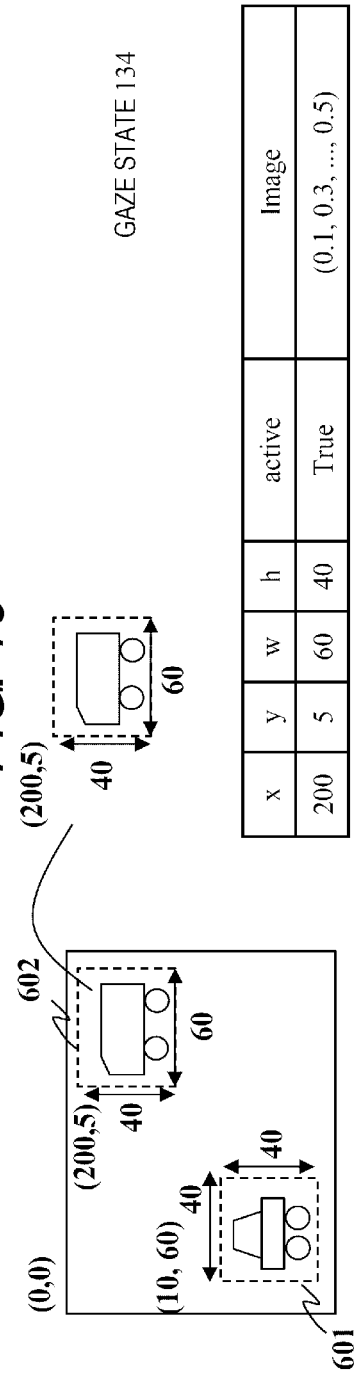
FIG. 10 is a diagram illustrating a gaze state after the update.

FIG. 10 shows an example in which the gaze state is updated in the image shown in FIG. 6. FIG. 10 shows a case where the rectangular region 601 is a region that is already managed by the working memory unit 120 as the second gaze region and for which a future image is predicted, and the rectangular region 602 is added as a new first gaze region by the gaze control unit 131.

The gaze control unit 131 controls the first gaze region (region 602 in FIG. 10) determined by the updated gaze state in order to generate a prediction image for the future.

As described above, the gaze control unit 131 outputs the first gaze region that is not processed by the working memory unit 120 from the gaze region candidates to the generation model unit 110. The generation model unit 110 receives information related to the first gaze region from the gaze control unit 131 and predicts the future image related to the first gaze region.

Figure 11:
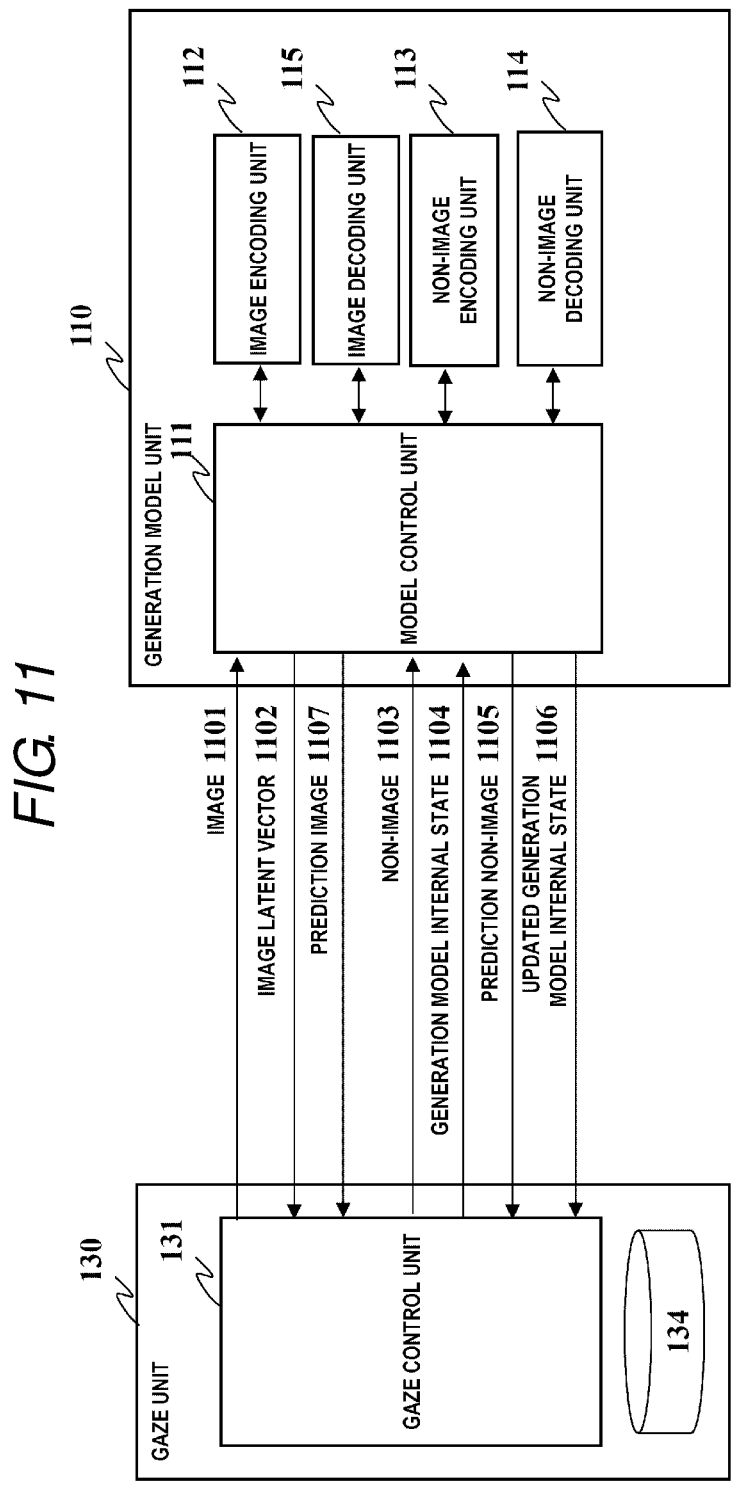
FIG. 11 is a diagram illustrating prediction image generation processing of the gaze region.

FIG. 11 is a diagram showing processing of the generation model unit 110 generating the prediction image of the first gaze region. FIG. 11 is an excerpt of a portion related to the processing from FIG. 1A.

The gaze state 134 is divided into image information and non-image information. The non-image information is the coordinates and the size of the first gaze region to be processed. In a case of a system capable of acquiring depth information, the depth information can be included in the non-image information.

The gaze control unit 131 inputs image information (image 1101 (image 75 in FIG. 7)) of the gaze state 134 to the image encoding unit 112 via the model control unit 111 of the generation model unit 110. The image encoding unit 112 converts the image into a corresponding vector.

The vector obtained by converting the image by the generation model unit 110 is referred to as a latent vector, and a result of converting the image of the first gaze region in the first embodiment into the latent vector is referred to as a gaze region image latent vector (hereinafter, image latent vector 1102).

The generation model unit 110 generates a prediction latent vector when an observation image of the first gaze region is input from the gaze unit 130 as the image 1101, and outputs the prediction latent vector as the image latent vector 1102 to the gaze unit 130. Further, the model control unit 111 inputs the generated image latent vector 1102 to the image decoding unit 115, and generates an image corresponding to the latent image vector. The generation model 110 outputs the generated image to the gaze control unit 131 as a gaze region prediction image (hereinafter, prediction image 1107) for the first gaze region.

The gaze control unit 131 inputs non-image information (hereinafter, non-image 1103) of the first gaze region to the non-image encoding unit 113 via the model control unit 111, and generates a gaze region non-image latent vector (hereinafter, a non-image latent vector). The model control unit 111 inputs the generated non-image latent vector to the non-image decoding unit 114, and generates a vector having the same dimension as the coordinates and the size information of the gaze region. The model control unit 111 outputs the generated vector to the gaze control unit 131 as a gaze region prediction non-image (hereinafter, prediction non-image 1105) indicating a prediction position of the first gaze region.

The prediction image 1107 is image information to be predicted at a next time for the current image 1101. The prediction non-image 1105 is non-image information to be predicted at a next time for the current non-image 1103. A generation model internal state 1104 is information indicating the generation model internal state, and corresponds to the generation model internal state 76 in FIG. 7.

A specific configuration of the image encoding unit 112, the non-image encoding unit 113, the non-image decoding unit 114, and the image decoding unit 115 in the generation model unit 110 will be described.

As the image encoding unit 112 and the image decoding unit 115, an encoding unit and a decoding unit of an auto-encoder based on a neural network or a variational auto-encoder are used. As the non-image encoding unit 113 and the non-image decoding unit 114, a recurrent neural network (RNN) or a long-short-term memory (LSTM) which is a time-series model based on a neural network are used.

Figure 12:
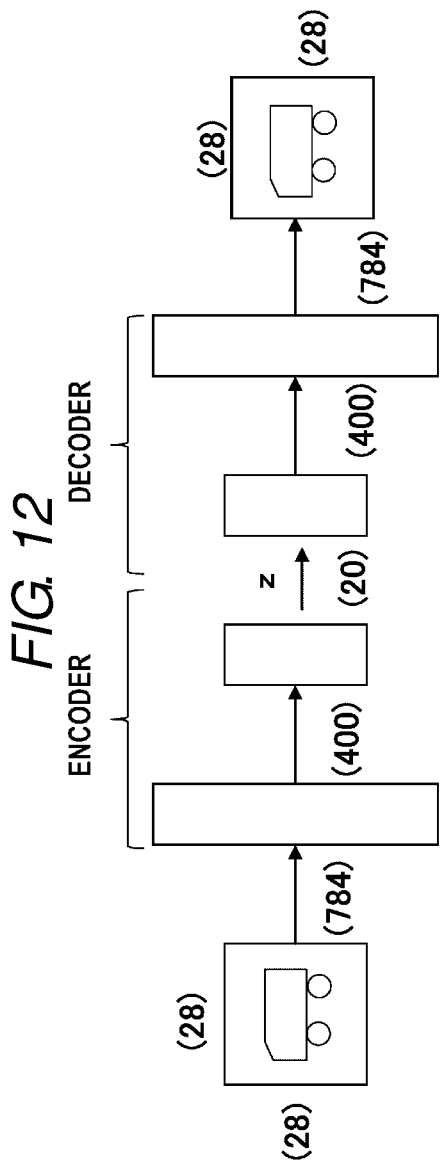
FIG. 12 is a diagram showing a configuration example of an auto-encoder.

FIG. 12 is a diagram showing a configuration example of the auto-encoder. The auto-encoder converts input data into data having a dimension lower than that of the once input data, and then converts the converted data into data having the input dimension again. The input data is converted into a potentially meaningful feature dimension (z) by making the neural network learn such that the output data is the same data as the input data. For example, in the example of FIG. 12, an example is shown in which, as an input image, image data with vertical and horizontal sizes being (28, 28) is input to the neural network as a 784-dimension vector and compressed to a 20-dimension. As shown in FIG. 12, in a case where the input dimension is a fixed length, when an image in the gaze region is input, image processing is applied such that a size of the image for image processing matches the input image size of the neural network. When a neural network independent of an input image size such as a Fully-Convolutional neural network is used, the preprocessing is not necessary.

Figure 13:
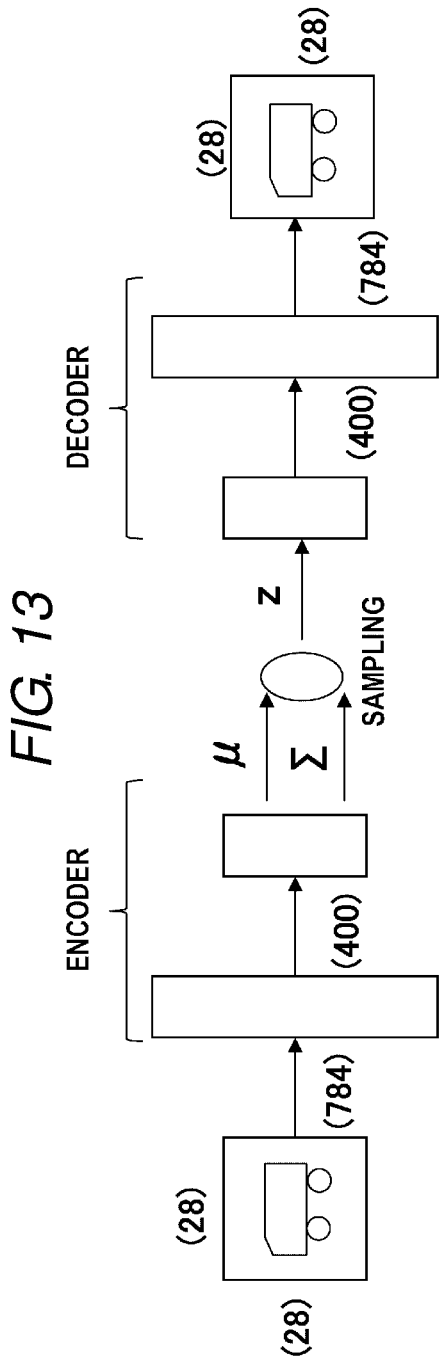
FIG. 13 is a diagram showing a configuration example of a variational auto-encoder.

FIG. 13 is a diagram showing a configuration example of the variational auto-encoder. The variational auto-encoder, similar to the auto-encoder, converts the input data into potentially meaningful feature dimensional data. However, the variational auto-encoder does not directly convert the input image to the latent vector, but converts the input image into an average vector (p) and a variance vector ($\Sigma$) assuming existence of a multidimensional normal distribution in which the latent vector is generated. The decoder of the variational auto-encoder learns converting a vector (z) sampled from the converted multidimensional normal distribution into an input image in a manner similar to that of the auto-encoder.

The auto-encoder of FIG. 12 and the variational auto-encoder of FIG. 13 are applied to image information processing. In general auto-encoder and variational auto-encoder, the same data is used for the input data and the output data, but in the present embodiment, an image at the current time is used as input data, and a future observation image corresponding to the input data is provided as the output data of the auto-encoder for the purpose of generating a future prediction image corresponding to the input data.

Figure 14A:
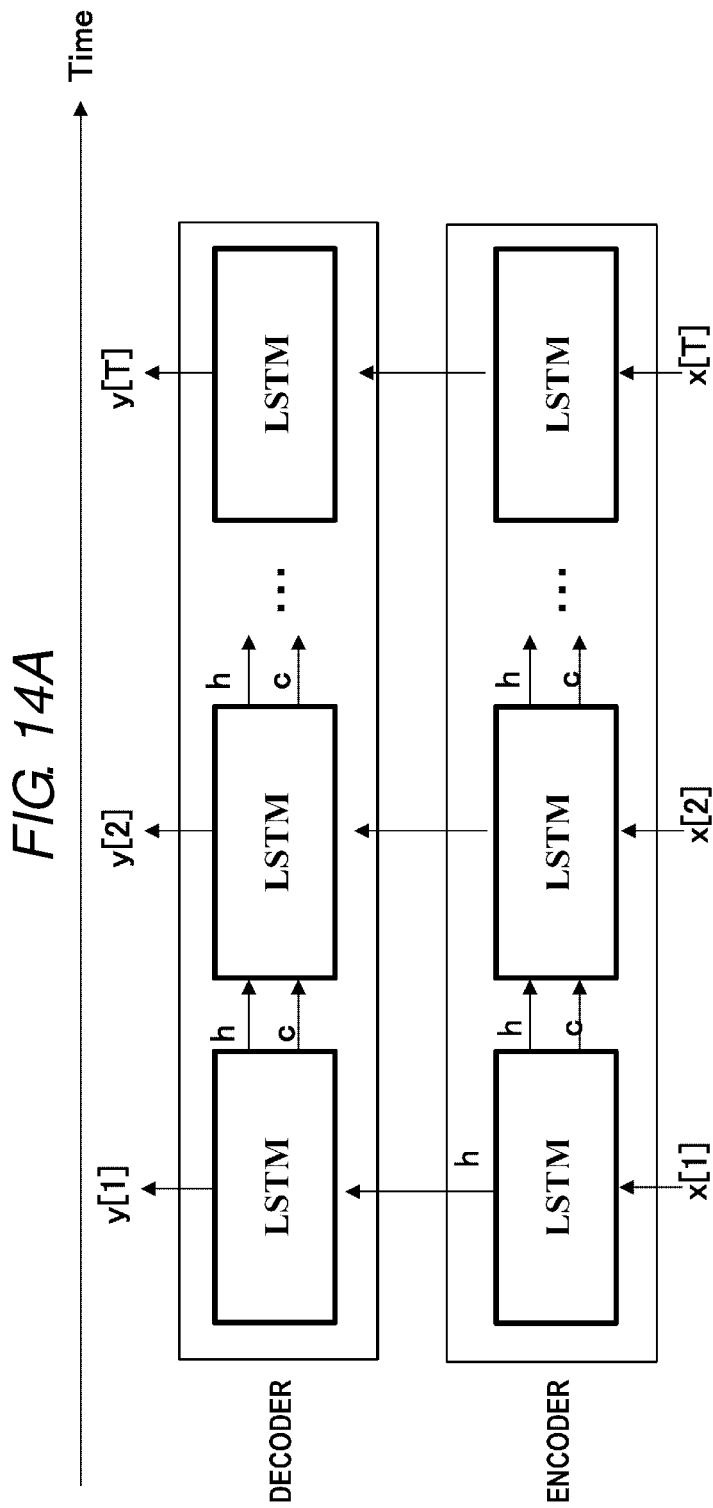
FIG. 14A is a diagram showing a configuration example of a non-image encoding unit and a non-image decoding unit used in an LSTM.

FIG. 14A shows a configuration example when the LSTM is used as the encoder and the decoder. A case where an input vector x [t] is input to the LSTM corresponding to the encoder for each time point t and the LSTM corresponding to the decoder that uses a vector (h) of a hidden layer as input sequentially outputs y [t] is shown. A model that considers a time series such as the LSTM has not only model parameters such as neural network weights but also an internal state determined by the processing up to that point, and by inputting the internal state, it is possible to consider the time series. In the case of LSTM, the internal state is, for example, an output value (h) of the hidden layer and a cell value (c).

The encoder and decoder of FIG. 14A are adapted for processing the non-image information. The output value (h) and the cell value (c) shown in FIG. 14A correspond to the generation model internal state 76 shown in FIG. 7.

Although the generation model for the image information processing of FIGS. 12 and 13 and the generation model for the non-image processing of FIG. 14A are constructed independently, as shown in FIG. 14B, it is also possible to construct a model in which the image encoding and decoding units and the non-image encoding and decoding units correlate with each other by inputting respective encoding results to each other.

In this example, not only the variational auto-encoder as shown in FIG. 13 but also the prediction model at the next time as shown in FIG. 14A will be described using terminology of the generation model.

The system according to the first embodiment holds the generation model internal state as the gaze state, and gives a timely and appropriate internal state as input. The generation model internal state is updated each time the calculation is performed. Therefore, in order to appropriately input the internal state at the next time or thereafter, the model control unit 111 outputs an updated internal state 1106 to the gaze control unit 131, and the gaze control unit 131 updates the gaze state 134 based on the acquired updated internal state 1106.

By defining the output y[t] corresponding to the input x[t] and learning the LSTM, it is possible to learn a model that predicts a change in output vector corresponding to a time-series change in input vector. The prediction non-image 1105 can include not only the position of the gaze region but also the size thereof. In this case, the system according to the first embodiment causes the encoder and the decoder to learn such that the coordinates and size of the gaze region are input and the coordinates and size of the gaze region at the next time are output, thereby predicting a spatial position and the size of the gaze region at the next time.

The system according to the first embodiment can be configured such that, as the auto-encoder or the variational auto-encoder and the LSTM, the image encoding unit, the image decoding unit, the non-image encoding unit, and the non-image decoding unit of the generation model can be made to learn in advance using a target image assumed by the system and motion information thereof, and a parameter of the neural network which is a learning result can be given as the generation model to be received from the outside.

In addition, by storing the corresponding learning data in the storage device 162 and holding a neural network learning mechanism inside while the system is operating, it is possible to update the parameters of the neural network by performing online learning in a timely manner while the system is operating.

FIG. 15 is a diagram showing an example of generation of a prediction image for the first gaze region managed by the gaze control unit 131. As shown in FIG. 15, the prediction image 31 is generated by combining an image 1503, that is obtained by converting the prediction image 1107 to a size of a region 1502 defined by the generated prediction non-image 1105, on a canvas 1501 having the same size as the observation image 30 at the region 1502.

The canvas 1501 has a configuration in which a blank canvas is set for each time point, a configuration in which a prediction image one period time before is a canvas, and a configuration in which an observation image is a canvas. When the gaze region of the observation image is different from the size of the rectangular region of the prediction non-image, the size of the rectangular region of the prediction non-image is resized by the computer vision algorithm in advance and then combined.

When the current observation image is used for the canvas, a removed image that is a partial region indicated by the non-image information of the gaze region before the update is generated, and the prediction image is combined for the generated removed image.

By the above procedure, the gaze unit 130 can generate the prediction image (t=2) of the first gaze region in the observation image, which is determined according to the observation image 30 (for example, observation time t=1 of FIG. 3) and the corresponding prediction image 31 (t=1).

Next, when a new observation image 30 (t=2) is acquired at the next time point for the generated prediction image 31 (t=2), whether to end the gaze or to update the first gaze region is determined based on a prediction error between the first gaze region of the observation image 30 (t=2) and the first gaze region of the prediction image 31 (t=2). The processing is performed by the object-based gaze region determination unit 133.

The object-based gaze region determination unit 133 obtains a region corresponding to the first gaze region described above from the new observation image. Simply, the prediction image 1107 is used as a template, and template matching processing is executed for the new observation image 30 (t=2). Further, considering the problem as object tracking, the object-based gaze region determination unit 133 can constitute a search algorithm for the region corresponding to the first gaze region using an object tracking algorithm in a computer vision field. When the change in the image is small and the prediction image can be generated with high accuracy, such a search method can be used.

On the other hand, when the change in the image is large and the accuracy of the prediction image is low, matching processing of the new observation image (t=2), the image latent vector 1102, and the prediction non-image 1105 are executed for the purpose of more robust matching.

Figure 16:
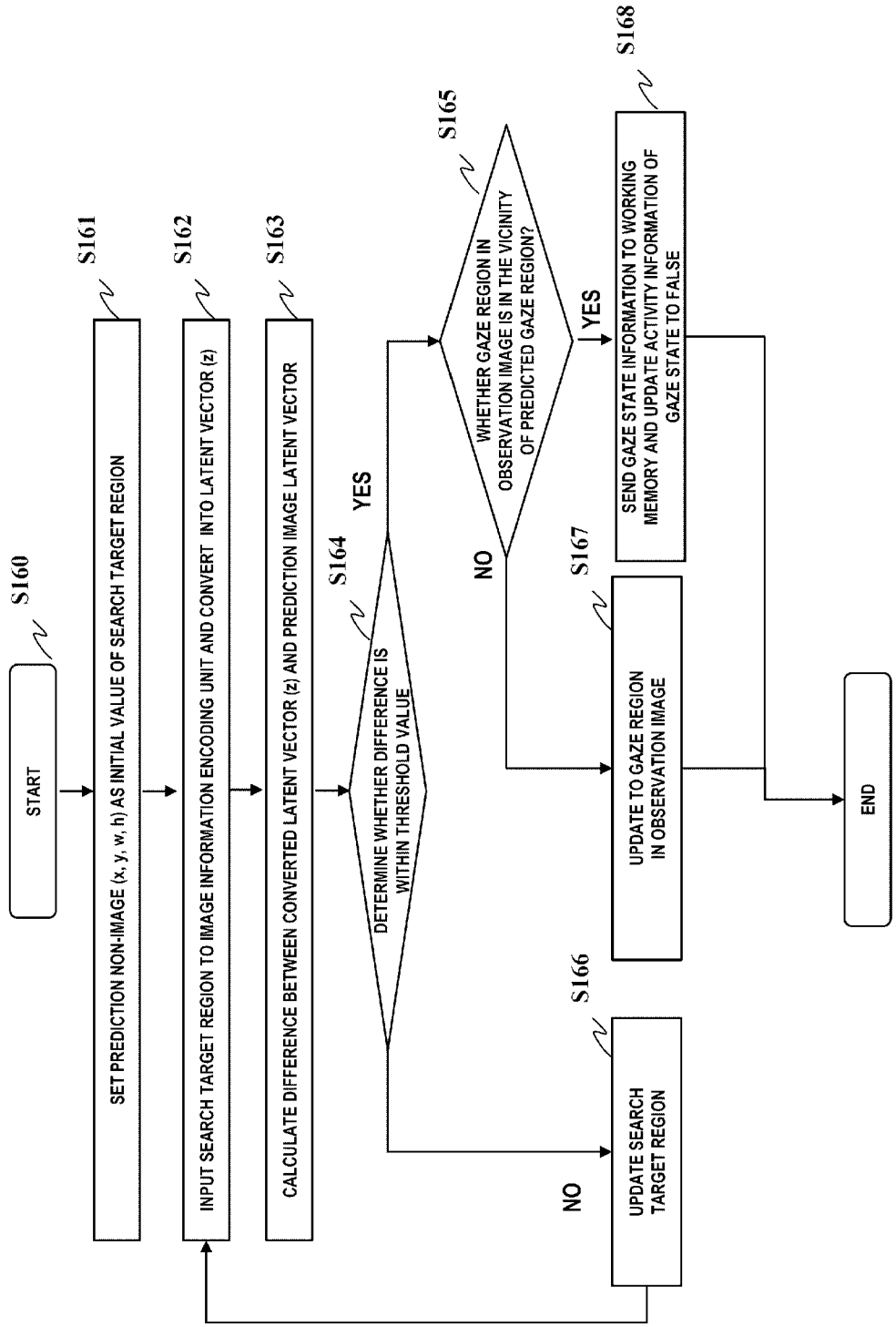
FIG. 16 is a flowchart showing matching processing for the gaze region, and an update procedure of the gaze region.
Figure 17:
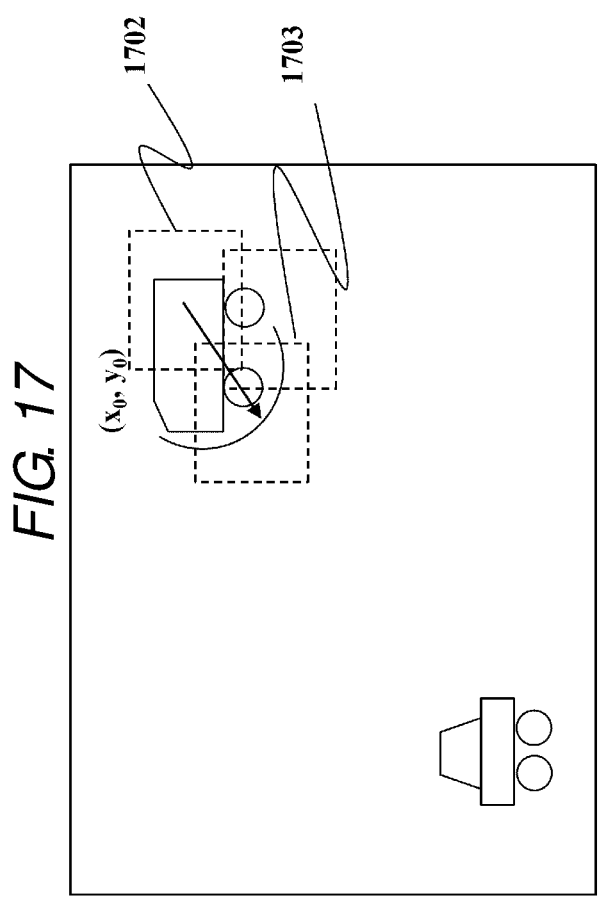
FIG. 17 is a diagram showing a search process in the matching processing for prediction of the gaze region.

FIG. 16 is a flowchart showing an example of the matching processing procedure for prediction of the gaze region of the gaze unit 130. The processing determines whether to end the gaze processing of the gaze unit 130 or to update the first gaze region. The processing of FIG. 16 will be described with reference to FIG. 17 showing an example of a search process in the matching processing for the prediction of the gaze region.

First, a region specified by the prediction non-image 1105 is set as an initial window (1702 of FIG. 17) (S161).

Image information of a region cut out from the observation image 30 and corresponding to the set window 1702 is output to the generation model unit 110. The generation model unit 110 converts the image information to a latent vector (z) using the image encoding unit 112 (S162). The gaze control unit 131 receives the converted latent vector (z) from the generation model unit 110. In this step, a latent vector of the observation image which is actually observed is obtained.

Next, a difference between the converted latent vector (z) and the image latent vector 1102, which is information related to the prediction image of the first gaze region, is calculated (S163). Accordingly, a difference between the observation image and the prediction image at the same time is grasped for an object such as a person or a vehicle in the gaze region.

The calculated difference is compared to a predetermined threshold value (S164). When the difference is smaller than the predetermined threshold value, it is determined whether the first gaze region in the observation image is in the vicinity of the predicted first gaze region (S165). The vicinity determination is performed based on whether the difference in coordinate and size between the regions is smaller than the predetermined threshold value. When the difference in the first gaze regions between the observation image and the prediction image is equal to or less than the predetermined value, it is determined that the prediction can be executed with sufficient accuracy, the first gaze region is output to the working memory unit, and the activity information of the gaze state is updated to False (S168). This is because the processing for the first gaze region determined to be in the vicinity is shifted to the working memory unit 120, and is not processed by the gaze unit 130. That is, the first gaze region is shifted to the working memory unit 120 as the second gaze region. The working memory unit manages information on the first gaze region as the second gaze region.

When it is determined that the region is not in the vicinity, it is determined that the current first gaze region is not sufficiently predicted, and the gaze processing is continued. In this case, the coordinates (x, y) and the size (w, h), which are the information of the rectangular region in the gaze state, are updated as values of the rectangular region of the search window (S167). The activity information of the gaze state remains active (True value).

When it is determined in step S164 that the difference is not within the threshold value, the search window is updated according to a predetermined window update rule (S166). For example, the search window in FIG. 17 is changed from 1702 to 1703. As an update rule for the window, for example, a method of sequentially increasing or decreasing the coordinates and the size of the search window by a predetermined pixel value can be considered.

In the first embodiment, the first gaze region of the observation image 30 and the first gaze region of the prediction image 31 are not directly compared, but are compared after being converted into the latent vectors by the image encoding unit 112. According to this method, the comparison can be performed based on feature points of the entire gaze region instead of the fine difference in the gaze region. However, when it is known in advance that the change in the image is small, it is naturally possible to omit the conversion processing to the latent vector and directly compare the images.

In addition, in order to store the gaze state 134 into the working memory unit 120, the gaze control unit 131 transmits the current gaze state to the working memory control unit 121, and the working memory control unit 121 stores the received gaze state in a free working memory and sets the activity information to "True" (True value).

When all working memory is already in use, an oldest stored working memory region is erased and new information is written therein. As a method of implementing the function, the working memory control unit 121 can use, for each working memory region, a configuration including a memory region for managing the time point when data is stored and a configuration for managing the stored working memory ID by a queue.

In the initial state, inactive information is stored in all working memory. In this case, the working memory unit 120 does not affect the generation of the prediction image 31. When it is determined that the first gaze region of the observation image can be sufficiently predicted and the gaze state is released, the gaze state up to that point is stored in the memory state 122 of the working memory unit 120, and the activity information is set to the True value. When the memory state 122 is active, the prediction image for the second gaze region stored in the memory state 122 is generated in the same manner as the gaze unit 130.

Figure 18:
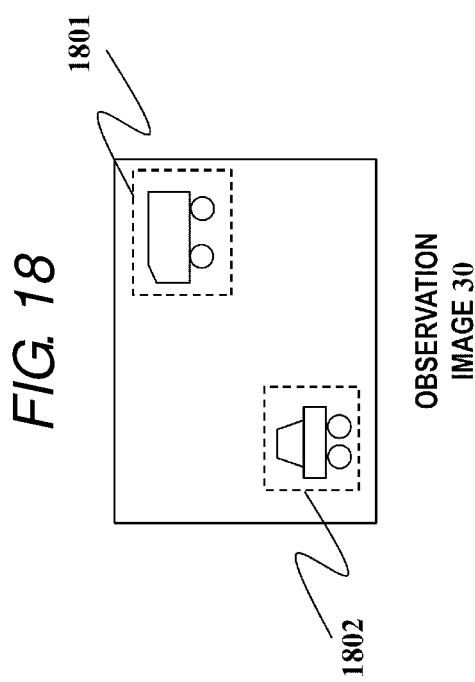
FIG. 18 is a diagram showing an example of a generation procedure of the prediction image.

FIG. 18 shows an example of a generation procedure of the prediction image. When it is determined that the prediction image is generated by the gaze unit 130 and a prediction error for a first gaze region 1801 is sufficiently small, the region is stored in the working memory unit 120. The gaze unit 130 sets another new region 1802 as the first gaze region.

Figure 19:
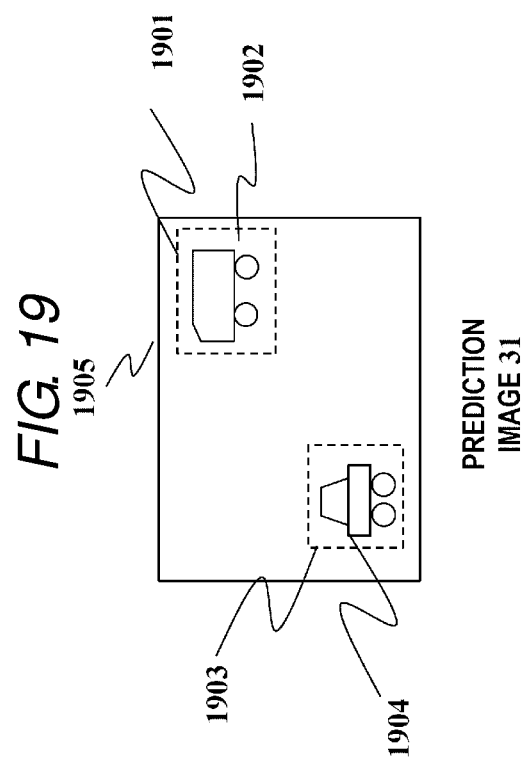
FIG. 19 is a diagram illustrating generation of the prediction image including a gaze region stored in a working memory.

FIG. 19 shows an example of a generation procedure of the prediction image 31. As shown in FIG. 19, a prediction image including a vehicle image 1904 in a current first gaze region 1903 is generated on a canvas 1905 having the same size as the observation image 30. At the same time, a prediction image 1902 of a second gaze region 1901 stored in the working memory unit 120 is generated. As in the case of the gaze unit 130, the generation model is used to generate the prediction image of the second gaze region stored in the working memory unit 120.

Figure 20:
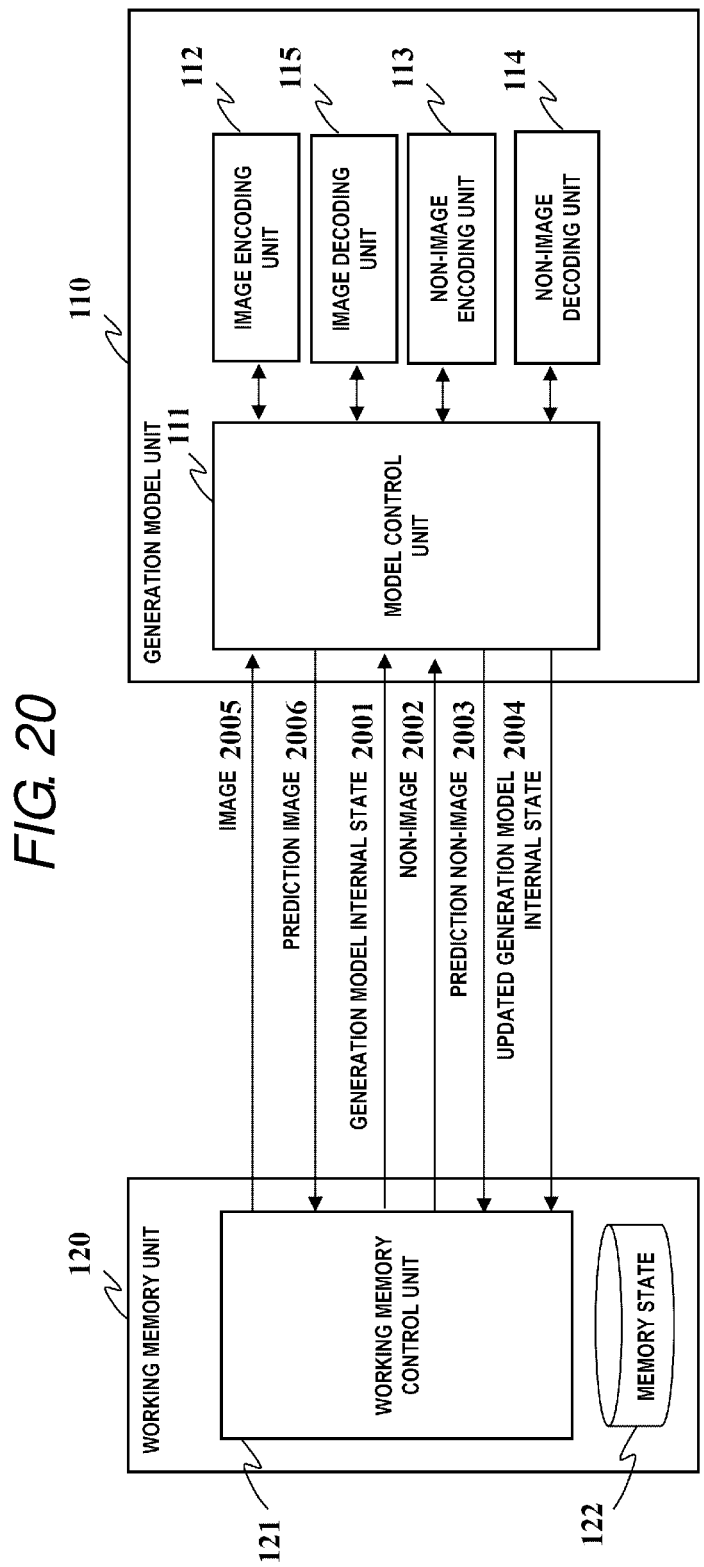
FIG. 20 is a diagram illustrating system components related to the prediction image generation of the gaze region in the working memory.

FIG. 20 shows a configuration extracted from FIG. 1A and related to the generation of the prediction image for the second gaze region managed by the working memory unit 120. The working memory control unit 121 transmits a generation model internal state 2001 (generation model internal state 85 of FIG. 8) stored in the working memory, non-image information 2002 (coordinates 81, size 82 of FIG. 8) of the gaze region, and an image 2005 of the gaze region (image 84 of FIG. 8) to the model control unit 111. The model control unit 111 inputs the internal state 2001 and the non-image information 2002 to the non-image encoding unit 113 and the non-image decoding unit 114, and generates a prediction value of the non-image information of the gaze region. In addition, the model control unit 111 inputs the image 2005 to the image encoding unit 112 and the image decoding unit 115, and generates a prediction image 2006 of the gaze region.

The model control unit 111 transmits a generated prediction non-image 2003 of the second gaze region, an updated generation model internal state 2004, and the prediction image 2006 to the working memory control unit 121. According to the prediction non-image 2003, the updated generation model internal state 2004, and the prediction image 2006, the working memory control unit 121 updates the state information of the corresponding working memory, and combines the prediction image 2006 to the second gaze region determined by the prediction non-image 2003.

Here, a difference between the generation processing of the prediction image of the gaze unit 130 and the generation processing of the prediction image of the working memory unit 120 will be described. In the prediction of the gaze unit 130, the difference between the observation information and the prediction information at each time point is calculated. When the difference is large, the gaze state based on the observation information is updated, whereas the difference between the observation and the prediction is not calculated in the working memory unit 120. This is because a calculation amount is large, and a sequential prediction error is not corrected for the second gaze region stored in the working memory unit 120. For the prediction of the second gaze region stored in the working memory unit 120, the prediction non-image generated by the non-image encoding unit 113 and the non-image decoding unit 114, and the prediction image generated by the image encoding unit 112 and the image decoding unit 115 of the generation model 110 in the system are used as input for the next time point.

Therefore, as the prediction time increases, the prediction error may accumulate. When the accuracy of the prediction image is required rather than the calculation processing time, it is also possible to execute processing on the second gaze region of the working memory unit 120 in the same manner as in the gaze region of the gaze unit 130 and to correct the sequential prediction error.

As described above, according to the first embodiment, since the prediction image is generated by focusing on the gaze region including the object in the observation image, the object in the prediction image can be identified. For the gaze region where the difference between the observation image and the prediction image is large, the prediction image is generated by the gaze unit, and for the gaze region where the difference is small, the prediction image is generated by the working memory unit, and the control unit combines the prediction images to generate a prediction image for the observation image, so that the prediction processing can be performed at a high speed.

Second Embodiment

In the first embodiment, the first gaze region in the observation image and the second gaze region of the working memory are independent of each other in generation of the prediction. Since objects such as vehicles and persons are expected to be stored in respective gaze regions, for example, the fact that the predictions of the first gaze region and the second gaze region of the working memory are independent of each other assumes that there is no mutual dependency between the objects. In the second embodiment, a case where gaze regions are correlated with each other will be described. That is, a case where at least two gaze regions correlated with each other in a gaze region group including a plurality of first gaze regions and a plurality of second gaze regions will be described.

Figure 21:
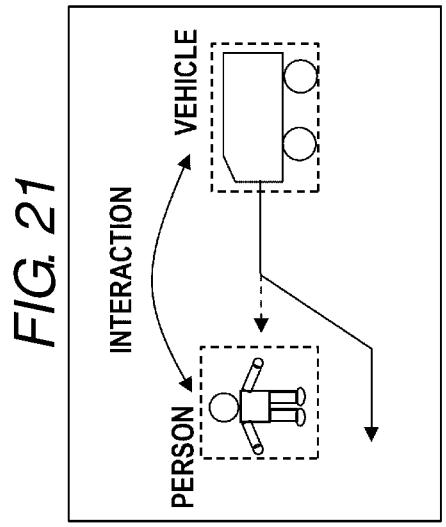
FIG. 21 is a diagram illustrating a case where interaction between gaze regions needs to be taken into consideration.

FIG. 21 shows an example in which the prediction of the gaze regions is correlated with each other. When there is a person in front of a moving vehicle, it is conceivable that the movement of the vehicle and the person may affect each other. For example, the movement of the vehicle may be different depending on whether there is a person in front of the vehicle.

Figure 22:
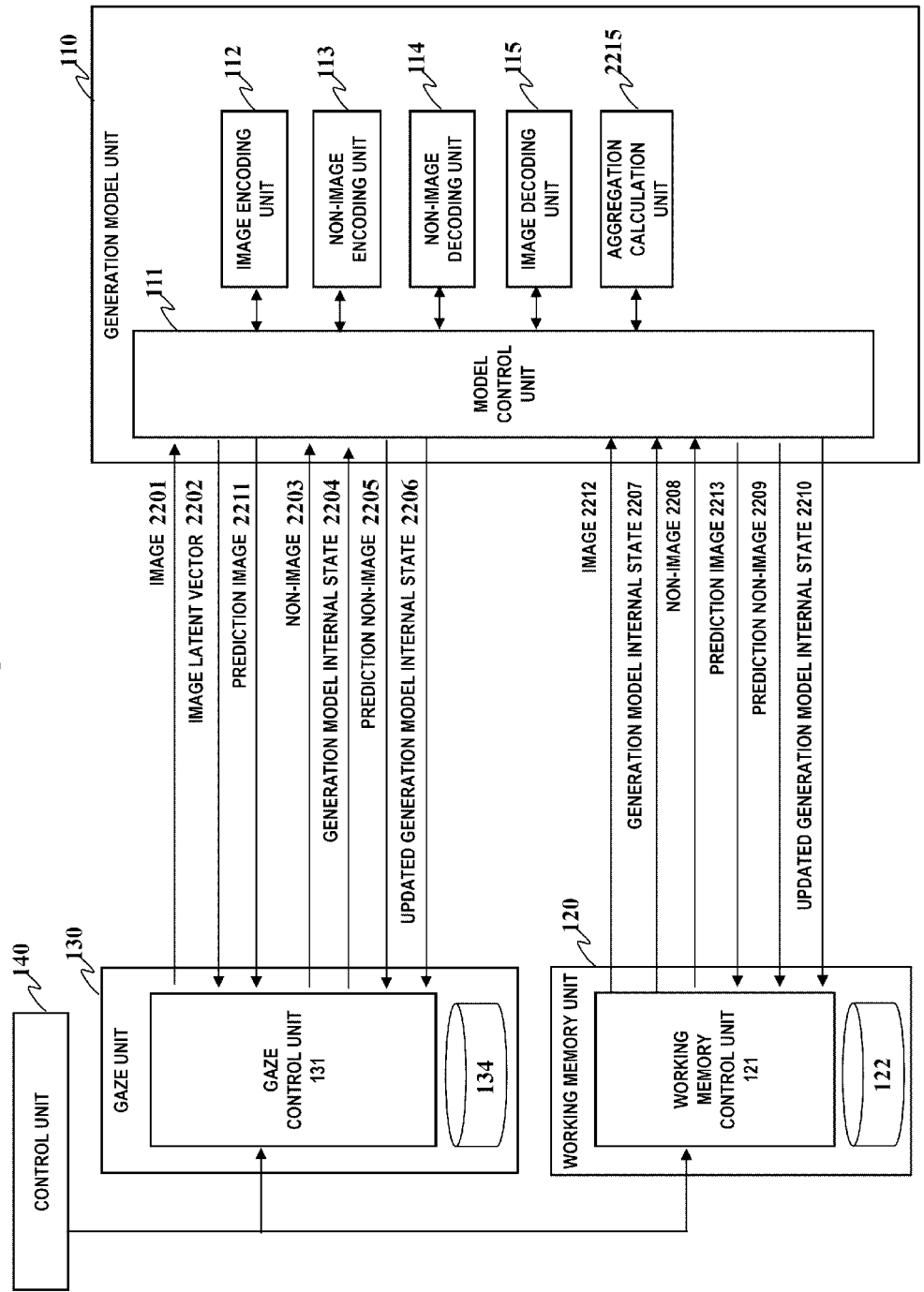
FIG. 22 is a diagram illustrating system components when the interaction between the gaze regions is taken into consideration.

FIG. 22 shows a configuration example of a system related to generation of the prediction according to the second embodiment. The control unit 140 controls the gaze control unit 131 and the working memory control unit 121 to generate a prediction image and a prediction non-image. In the second embodiment, in the prediction of the image and the non-image, the image encoding unit 112 and the non-image encoding unit 113 similar to those in the first embodiment can be used for encoding processing of image information and non-image information. On the other hand, in decoding processing, considering the interaction between the objects, latent vectors generated by the image encoding unit 112 and the non-image encoding unit 113 are aggregated by an aggregation calculation unit 2215 and input to the image decoding unit 115 and the non-image decoding unit 114.

The control unit 140 controls the gaze control unit 131 to output image information 2201 and non-image information 2203 of the first gaze region and a generation model internal state 2204 to the model control unit 111.

As in the first embodiment, the model control unit 111 inputs the image information 2201 and the non-image information 2203 of the first gaze region, and the generation model internal state 2204 that are received to the image encoding unit 112 and the non-image encoding unit 113, and the image encoding unit 112 and the non-image encoding unit 113 generate an image latent vector 2202 and a non-image latent vector, respectively.

The control unit 140 controls the working memory control unit 121 to output image information 2212 and non-image information 2208 of the second gaze region, and a generation model internal state 2207 in a memory whose activity information (83 of FIG. 8) in the memory state 122 is active (True) to the model control unit 111.

As in the first embodiment, the model control unit 111 inputs image information 2212 and non-image information 2208 of the second gaze region, and a generation model internal state 2207 that are received to the image encoding unit 112 and the non-image encoding unit 113, and the image encoding unit 112 and the non-image encoding unit 113 generate an image latent vector and a non-image latent vector, respectively.

The control unit 140 generates a prediction image and a prediction non-image for each region based on the generated encoding information of the image and non-image information for the first gaze region and the encoding information of the image and non-image information for the second gaze region.

Figure 23:
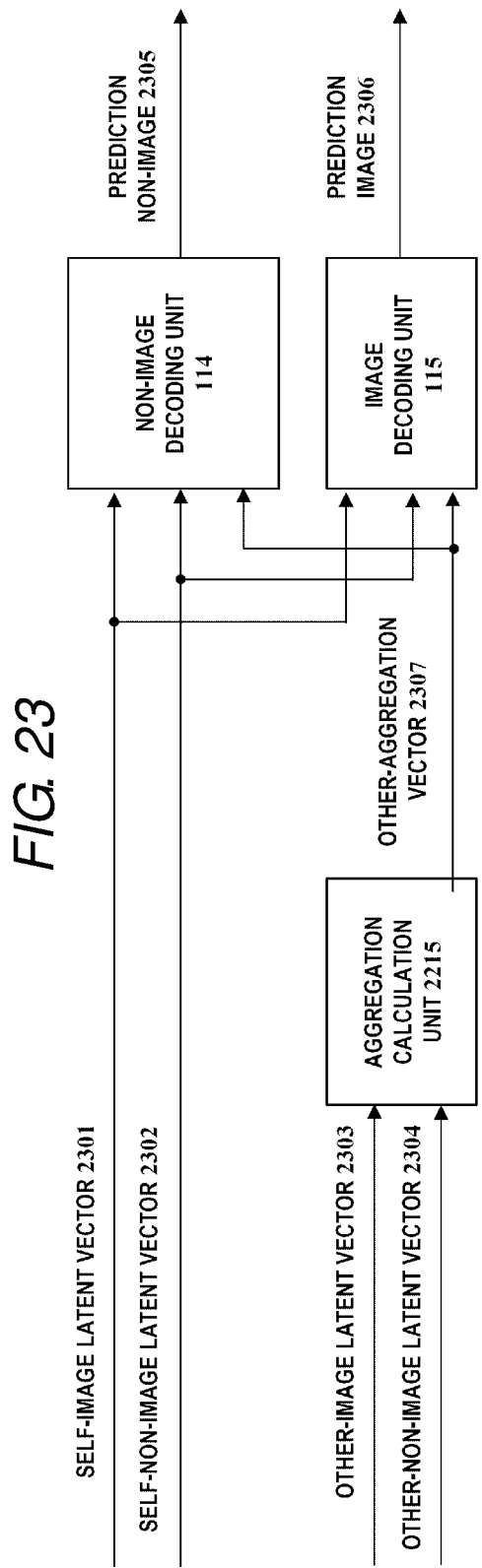
FIG. 23 is a diagram illustrating a configuration of a non-image information decoding unit when the interaction between the gaze regions is taken into consideration.

The prediction image and the prediction non-image for each region are generated for each region. As shown in FIG. 23, for the generation of the prediction of each region, a generation target region is set as a self-region, an image latent vector of that region is set as a self-image latent vector 2301, a non-image latent vector is set as a self-non-image latent vector 2302, and the self-image latent vector 2301 and the self-non-image latent vector 2302 are input to the non-image decoding unit 114, and the image decoding unit 115.

Further, regions other than the generation target are set as the other regions, image latent vectors of a plurality of the other regions are set as other-image latent vectors 2303, and non-image latent vectors are set as other-non-image latent vectors 2304. The other-image latent vector 2303 and the other-non-image latent vector 2304 are input to the aggregation calculation unit 2215 to generate an other-aggregation vector 2307, and the generated other-aggregation vector 2307 is input to the non-image decoding unit 114 and the image decoding unit 115.

Figure 24:
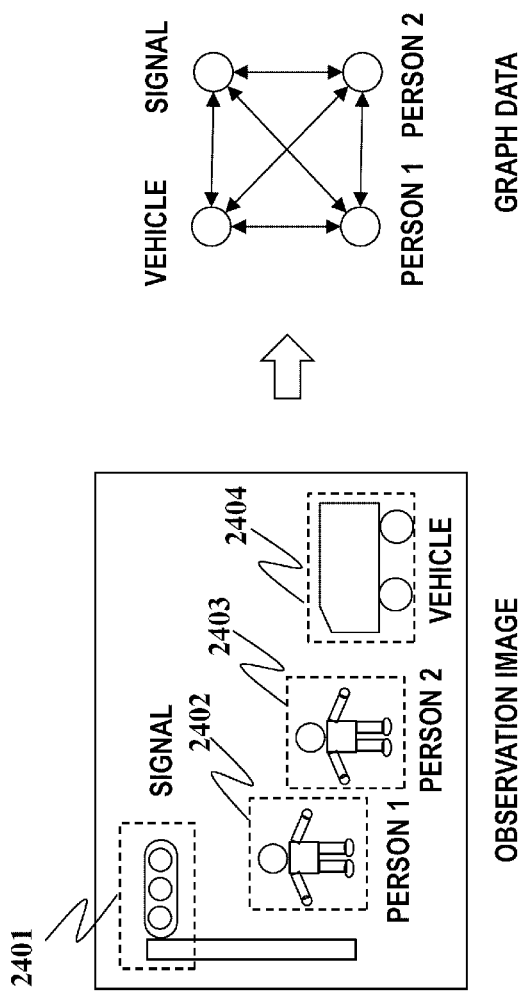
FIG. 24 is a diagram showing graph data for an observation image based on gaze information and working memory information.

For example, a person 2402 of FIG. 24 being in a generation target region is set as a self-region, the self-image latent vector 2301 and the self-non-image latent vector 2302 are input to the non-image decoding unit 114 and the image decoding unit 115.

On the other hand, a person 2403, a vehicle 2404, and a signal 2401 are set as other regions, the other-image latent vector 2303 and the other-non-image latent vector 2304 are input to the aggregation calculation unit 2215 to generate the other-aggregation vector 2307, and the other-aggregation vector 2307 is input to the non-image decoding unit 114 and the image decoding unit 115.

The non-image decoding unit 114 generates a prediction non-image 2305 based on the input self-image latent vector 2301, self-non-image latent vector 2302, and other-aggregation vector 2307. Similarly, the image decoding unit 115 generates a prediction image 2306 based on the input self-image latent vector 2301, self-non-image latent vector 2302, and other-aggregation vector 2307.

As shown in FIG. 23, a method of generating prediction information for each region in consideration of the influence of the surrounding region is a method of applying a neural network to graph data in which each region is set as a node and there is an edge between regions whose interaction is considered, which is called a graph neural network.

For example, a case as shown in FIG. 24 where four regions including the signal 2401, two persons (2402 and 2403), and the vehicle 2404 are stored in the first gaze region or the second gaze region is considered. When it is considered that the four regions have an influence on one another, a complete graph in which each region is set as a node and there are edges between all nodes is considered.

In order to generate the prediction information, the signal 2401, the two persons (2402 and 2403), and the vehicle 2404 are set as generation target regions for prediction, and the processing of FIG. 23 is applied for each region.

When the generation target region for prediction is the vehicle 2404, an image latent vector and a non-image latent vector of the vehicle 2404 are the self-image latent vector 2301 and the self-non-image latent vector 2302, respectively, and image vectors and non-image latent vectors of the signal 2401 and the two persons (2402 and 2403), which are connected to the node corresponding to the vehicle 2404 on the graph data, are the other-image latent vectors 2303 and the other-non-image latent vectors 2304. Similarly, when the generation target region for prediction is the signal 2401, the self-image latent vector 2301 and the self-non-image latent vector 2302 are an image latent vector and a non-image latent vector of the signal 2401, and image latent vectors and non-image latent vectors of the vehicle 2404 and two people (2402 and 2403) other than the signal are the other-image latent vectors and the other-non-image latent vectors.

When the generation target region is the first gaze region, the prediction image 2306 is the prediction image 2211 in FIG. 22, and the prediction non-image 2305 is the prediction non-image 2205 in FIG. 22. Similarly, when the generation target region is the second gaze region, the prediction image 2306 is the prediction image 2213 in FIG. 22, and the prediction non-image 2305 is the prediction non-image 2209 in FIG. 22.

The aggregation calculation unit 2215 executes an operation of aggregating the input image latent vectors and non-image latent vectors of a plurality of regions into a single vector. As a specific aggregation operation, it is conceivable to calculate a total value of respective vector values for each element, to calculate an average value for each element, or to concatenate respective vectors. In addition, when the aggregation is divided for the image latent vector and the non-image latent vector, an aggregate vector is generated for each of the image latent vector and the non-image latent vector. The aggregate vector is expected to be aggregated with information on interaction with other regions other than the generation target region.

The procedure of generating the prediction image of each gaze region and generating the prediction image 31 according to the generated prediction image information and prediction non-image information is similar to that of the first embodiment.

In the learning of the generation model, an objective function (also referred to as a loss function) can be constructed using difference information between input and output. In the case of a prediction model, difference information between prediction and observation is used. For example, when the input and the output are images of the same size, a difference in pixel at the same position between the input and the output can be defined as the difference between the input and the output.

As shown in FIG. 24, when the observation image is processed as a graph, it is necessary to calculate a difference as graph information in the calculation of the difference between the input and the output. In a graph neural network, a method of calculating a correspondence relationship (matching relationship) for each node in graphs of the input and the output and calculating a difference based on an obtained matching result is used. However, the calculation processing of the graph matching processing is large.

Figure 25:
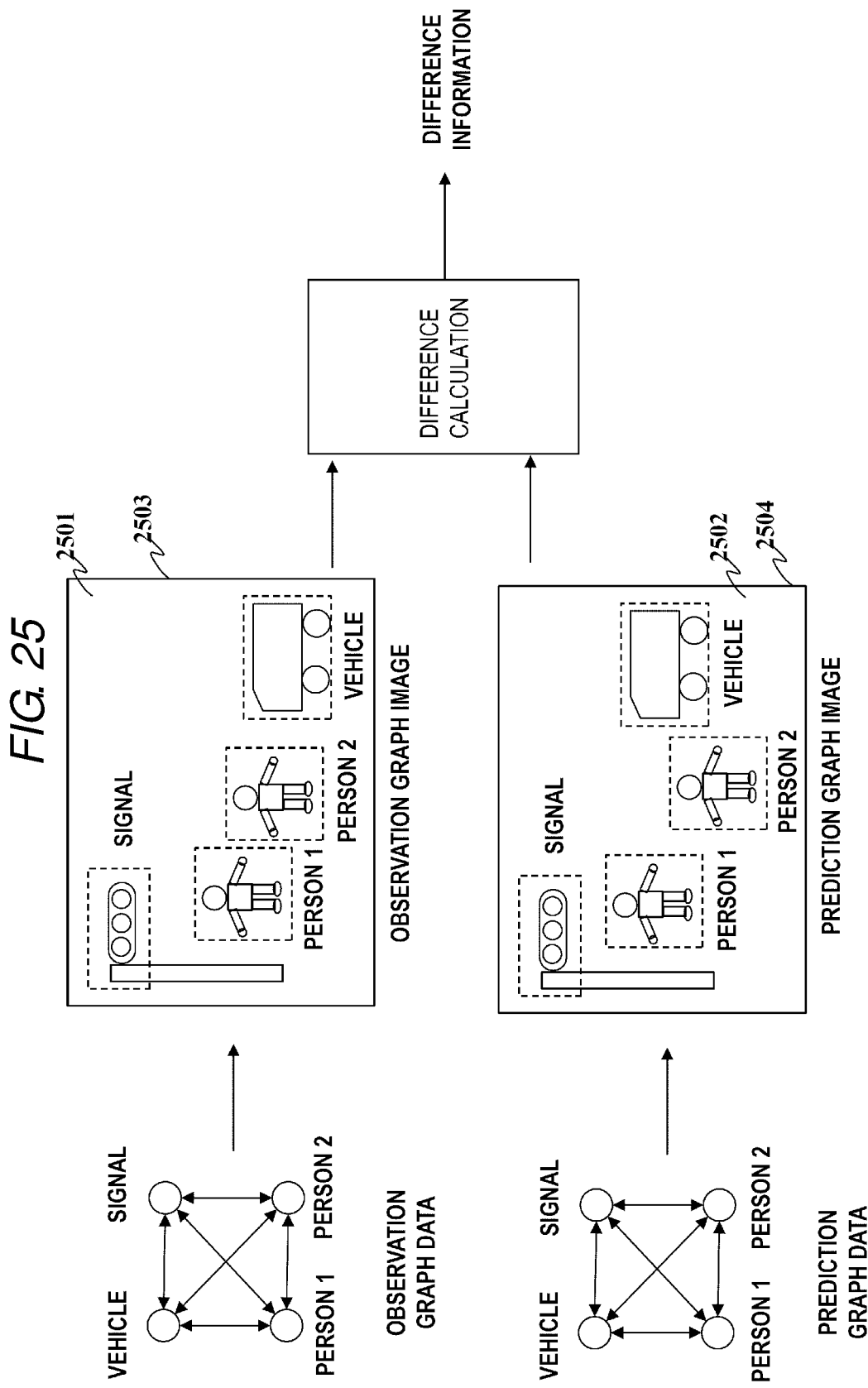
FIG. 25 is a diagram showing an example of converting the graph data into image data and calculating a difference in the image data.

In the learning related to the second embodiment, in order to reduce calculation cost of the graph matching processing, as shown in FIG. 25, the graph information to be processed by the generation model is set as a basis, based on the existence of image information for which the graph is generated, the graph information is converted into image information 2501 and image information 2502 and a difference of the converted image information is set as the difference information between the prediction and the observation without calculating the difference with the graph information as it is. The graph information is converted to the image information by combining the image information of each node on a canvas of the same size as the observation image according to the position and the size indicated by the non-image information of each node, as in the case of generating the prediction image based on the graph information. However, canvases 2503 and 2504 are all black or white blank canvases.

By using the black or white blank canvas as the canvas, it is possible to reduce the effect on difference related to regions other than the region indicated by the information included in the nodes in the graph, and appropriate convergence of learning can be expected.

According to the second embodiment, it is possible to generate the prediction non-image information for each region in consideration of the interaction between the gaze region of the gaze unit 130 and a plurality of gaze regions stored in the working memory.

Third Embodiment

A third embodiment illustrates a method of generating coordinates of an object, which is non-image information, by encoding processing and decoding processing for an image having both spatial information and temporal information.

Figure 26:
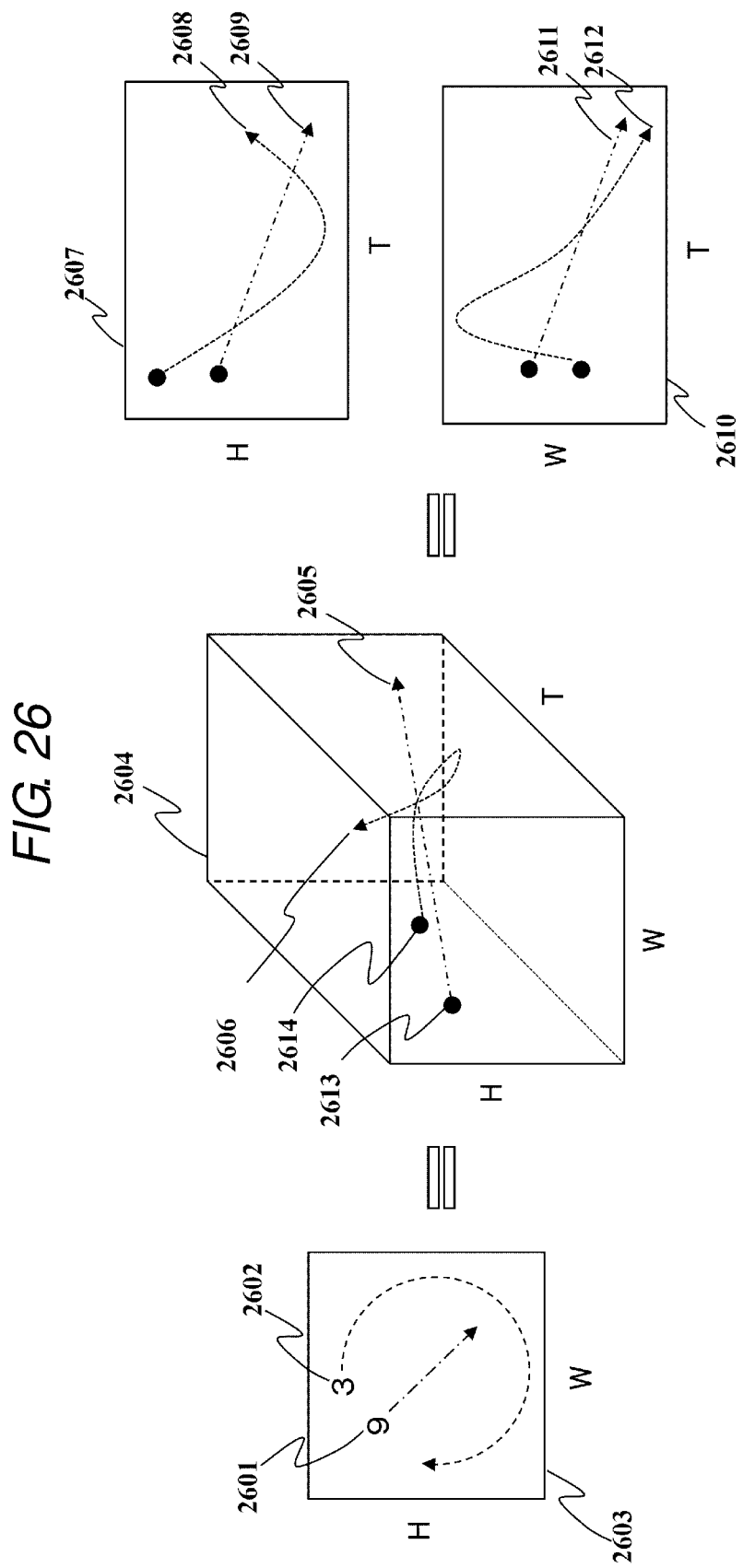
FIG. 26 is a diagram showing an example of spatial-temporal image data.

For example, as shown in FIG. 26, a case where a character "9" (2601) and a character "3" (2602) are moving on a visual field 2603 with a height H and a width W is considered. T is set as an observation time. When the character "9" (2601) and the character "3" (2602) are gazed as the first gaze region or the second gaze region by the same configuration and method as those of the first and second embodiments, a trajectory of the movement of the gaze can be considered as a trajectory on a cube 2604 of the height H, the width W, and a depth T. For example, the movement of the character "9" (2601) and the character "3" (2602) can be considered as a trajectory 2605 and a trajectory 2606 on a cube, respectively. Similarly, when the movements on the height H and the width W are considered, movements in height and width directions can be considered as a trajectory 2608 and a trajectory 2609 on a canvas 2607 with the height H and the width T, respectively, or can be considered as a trajectory 2611 and a trajectory 2612 on a canvas 2610 with the height W and the width T, respectively.

In the third embodiment, information on a three-dimensional (2604) or two-dimensional (2607 or 2610) trajectory that can be generated based on such movement information of the gaze region is referred to as a spatial-temporal image. Each point on the spatial-temporal image stores, at each time point, a value obtained by converting an image of each gaze region into a latent vector by using the image encoding unit 112. That is, when the height is H, the width is W, the observation time is T, and the dimension of the latent vector is D, the three-dimensionally cubic spatial-temporal image is represented as a four-dimensional tensor of magnitude (H, W, T, D).

For the purpose of generating the spatial-temporal image according to the gaze control shown in the first embodiment, in the third embodiment, as shown in FIG. 29, the gaze state 134 of the first gaze region and the memory state 122 of the second gaze region are added as temporal information 2901 and temporal information 2902 and managed as a time point gaze state 134a and a time point memory state 122a, respectively.

Figure 27:
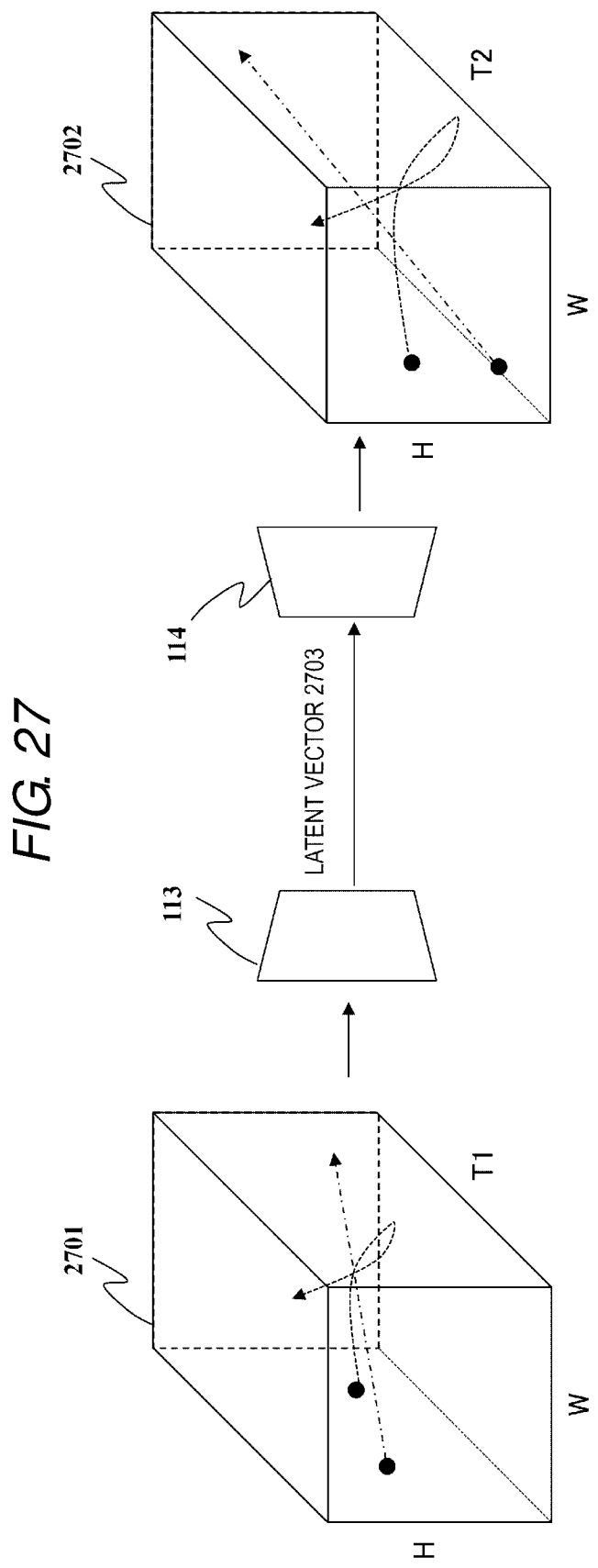
FIG. 27 is a diagram showing an example of a generation model for the spatial-temporal image data.

In the third embodiment, as shown in FIG. 27, the coordinates of the object which is non-image information are input to a spatial-temporal image 2701 of a given period T1, the spatial-temporal image 2701 is converted into a latent vector 2703 by the non-image information encoding unit 113, and a spatial-temporal image 2702 of a corresponding future given period T2 is generated by the non-image information decoding unit 114 using the converted latent vector 2703. The period T1 of the spatial-temporal image 2701 and the period T2 of the spatial-temporal image 2702 may have overlapping portions. The spatial-temporal image 2701 is generated by the control unit 140 via the gaze control unit 131 and the working memory control unit 121, and is transmitted to the model control unit 111 of the generation model 110. The generated spatial-temporal image 2702 is transmitted from the model control unit 111 to the control unit 140.

The control unit 140 applies compression and expansion processing and threshold value processing to the generated spatial-temporal image 2702 to form the spatial-temporal image. A threshold value of the threshold value processing is input from the outside as the gaze control configuration 151. The data at each point of the height H and the width W of the formed spatial-temporal image at each time point is a prediction value of the image latent vector of each point at each time point. The control unit 140 inputs the data at each point to the image decoding unit 115 via the model control unit 111 of the generation model 110, converts the image latent vector at each point into an image, and combines the image at each point at each time point with each point on the canvas having the same height and width as the spatial-temporal image 2702.

In the third embodiment, position information of the non-image information is generated using the configuration and the method of FIG. 27. When the spatial-temporal image is a two-dimensional trajectory (2607 or 2610 in FIG. 26), the non-image information encoding unit 113 and the non-image information decoding unit 114 can be the auto-encoder of FIG. 12 or the variational auto-encoder of FIG. 13, which is similar to the image encoding unit 112 and the image decoding unit 115 described in the first embodiment. In order to recognize a two-dimensional structure, a two-dimensional convolution operation and a two-dimensional pooling operation are generally applied to the auto-encoder and the variational auto-encoder for a two-dimensional image shown in FIG. 12 or FIG. 13.

Figure 28:
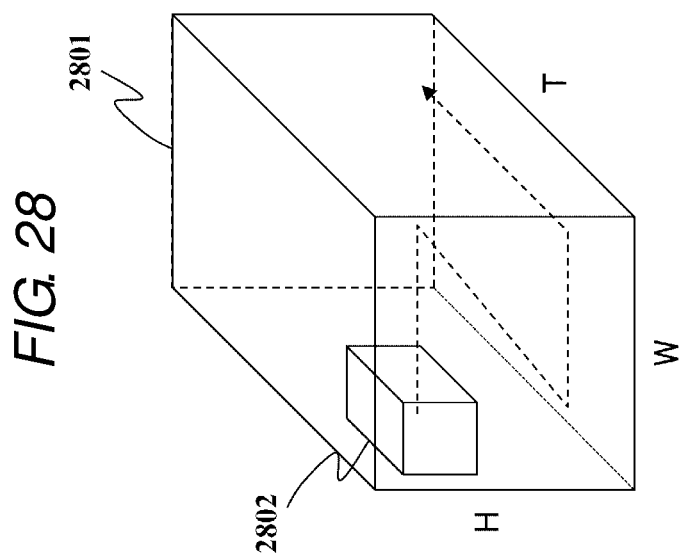
FIG. 28 is a diagram showing an example of a three-dimensional convolutional neural network.

Similarly, as shown in FIG. 28, in order to recognize a three-dimensional structure, it is possible to use a three-dimensional convolutional neural network in which the convolution operation and a pooling operation are applied as a three-dimensional kernel 2802 to a three-dimensional tensor 2801.

According to the third embodiment, the prediction of the coordinates of the object which are the non-image information can be performed in the same manner as the prediction of the image.

What is claimed is:

1. An image prediction system that generates a future prediction image based on an observation image, the image prediction system comprising:
   a gaze unit;
   a working memory unit;
   a control unit; and
   a generation model unit, wherein
   the gaze unit includes:
      a location-based gaze region determination unit that generates a difference for each pixel between an observation image and a prediction image for a region including an object in the observation image, generates a rectangular region including the object and determines the rectangular region as a first gaze region candidate,
      a gaze control unit that receives information related to the first gaze region candidate and selects one of the first gaze region candidate as a first gaze region under a predetermined condition, and
      a first storage unit that stores information on the first gaze region as a gaze state,
   the generation model unit
      generates a prediction image of the first gaze region,
   the working memory unit,
      when a difference in the first gaze region between the observation image and the prediction image is equal to or less than a predetermined value, sets the first gaze region as a second gaze region, and includes a second storage unit that stores the information on the second gaze region as a memory state, the generation model unit
generates the prediction image of the first gaze region and outputs the prediction image to the gaze control unit, and
generates a prediction image of the second gaze region and outputs the prediction image to the working memory unit, and the control unit
integrates the prediction image of the first gaze region from the gaze unit and the prediction image of the second gaze region from the working memory unit to generate a prediction image for the observation image.

2. The image prediction system according to claim 1, wherein
the gaze control unit obtains the difference in the first gaze region between the observation image and the prediction image by comparing latent vectors of image information of the observation image and the prediction image.

3. The image prediction system according to claim 2, wherein
the gaze control unit selects the first gaze region from the first gaze region candidate based on an area of the first gaze region candidate.

4. The image prediction system according to claim 2, wherein
the gaze control unit selects the first gaze region from the first gaze region candidate based on an object included in the first gaze region candidate.

5. The image prediction system according to claim 3, wherein
the gaze state stored in the first storage unit is information of managing coordinates, a size, image information, and a generation model internal state of the first gaze region in association with one another.

6. The image prediction system according to claim 5, wherein
the generation model internal state, the image information, and the non-image information including the coordinates and the size of the first gaze region are input from the gaze control unit to the generation model unit, the generation model unit outputs an image latent vector, a prediction non-image indicating a prediction position of the first gaze region, and the prediction image of the first gaze region to the gaze control unit.

7. The image prediction system according to claim 6, wherein
the generation model unit generates a prediction latent vector of the prediction image of the first gaze region from the gaze unit, and a latent vector of a region in the observation image specified by the prediction non-image, and
the gaze unit compares the prediction latent vector and the latent vector that are from the generation model unit, and controls the object to enter the first gaze region in the observation image.

8. The image prediction system according to claim 7, wherein
when the difference as a result of comparing the prediction latent vector and the latent vector that are from the generation model unit is equal to or less than a predetermined value, or when the difference in the first gaze region between the observation image and the prediction image is equal to or less than the predetermined value, the gaze unit outputs the first gaze region to the working memory unit, and
the working memory unit manages information on the first gaze region as the second gaze region.

9. The image prediction system according to claim 5, wherein
the memory state stored in the second storage unit is information of managing coordinates, a size, image information, and a generation model internal state of the second gaze region in association with one another.

10. The image prediction system according to claim 6, wherein
the generation model unit further includes
an image encoding unit that converts the first gaze region stored in the first storage unit and the second gaze region stored in the second storage unit into latent vector information,
a non-image information decoding unit that generates prediction information on a future position and size in each region based on the latent vector information, and
an image information decoding unit that generates prediction information on a future image in each region based on the latent vector information.

11. The image prediction system according to claim 6, wherein
the control unit divides at least each of the first gaze region stored in the first storage unit and the second gaze region stored in the second storage unit into a generation target region and a non-generation target region, and the generation model unit includes:
an aggregation calculation unit of the latent vector of the non-generation target region that converts each of the generation target region and the non-generation target region into latent vector information,
a non-image information decoding unit that generates prediction information on a future position and size by using vector information aggregated by the aggregation calculation unit and the latent vector information of the generation target region as input, and
an image information decoding unit that generates prediction information on a future image.

12. The image prediction system according to claim 6, wherein
learning of the generation model unit is to perform processing using
the coordinates, the size, and the image information of the gaze region stored in the first gaze region,
the coordinates, the size, and the image information of the gaze region stored in the second gaze region, and
image information generated in accordance with a blank image.

13. The image prediction system according to claim 6, wherein
the gaze state stored in the first storage unit is information of managing the coordinates, the size, the image information, the generation model internal state, and time information of the first gaze region in association with one another, and
the memory state stored in the second storage unit is information of managing the coordinates, the size, the image information, the generation model internal state, and time information of the second gaze region in association with one another.

14. The image prediction system according to claim 13, wherein the control unit generates information representing a time-series change of coordinates of at least one of the first gaze region and the second gaze region based on at least one of a time point gaze state that manages the first gaze region and temporal information, and a time point memory state that manages the second gaze region and temporal information, and the generation model unit includes:
  a non-image information encoding unit that converts the generated information representing the time-series change of the coordinates of the gaze region into a latent vector, and
  a non-image information decoding unit that generates information representing a time-series change of coordinates of a future gaze region based on the converted latent vector.

* * * * *